(12) United States Patent
Wang et al.

(10) Patent No.: US 10,587,325 B2
(45) Date of Patent: *Mar. 10, 2020

(54) METHOD FOR REPORTING CHANNEL STATE INFORMATION, USER EQUIPMENT, AND BASE STATION

(71) Applicant: Huawei Technologies Co., Ltd., Shenzhen (CN)

(72) Inventors: Jianguo Wang, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,798

(22) Filed: Feb. 12, 2019

(65) Prior Publication Data

US 2019/0190579 A1 Jun. 20, 2019

Related U.S. Application Data

(63) Continuation of application No. 15/289,277, filed on Oct. 10, 2016, now Pat. No. 10,224,996, which is a
(Continued)

(51) Int. Cl.
*H04B 7/06* (2006.01)
*H04B 7/04* (2017.01)
(Continued)

(52) U.S. Cl.
CPC ......... *H04B 7/0626* (2013.01); *H04B 7/0413* (2013.01); *H04B 7/0639* (2013.01);
(Continued)

(58) Field of Classification Search
None
See application file for complete search history.

(56) References Cited

U.S. PATENT DOCUMENTS 9,271,283 B2 2/2016 You et al.
9,391,681 B2 7/2016 Wang et al.
(Continued)

FOREIGN PATENT DOCUMENTS

CN 10772031 A 7/2010
CN 101917259 A 12/2010
(Continued)

OTHER PUBLICATIONS

3GPP TS 36.212 V12.0.0 (Dec. 2013); 3rd Generation Partnership Project; Technical Specification Group Radio Access Network; Evolved Universal Terrestrial Radio Access (E-UTRA); Multiplexing and channel coding (Release 12); 88 pages.
(Continued)

*Primary Examiner* — Saba Tsegaye
(74) *Attorney, Agent, or Firm* — Slater Matsil, LLP

(57) ABSTRACT

Embodiments of the present disclosure disclose a method for reporting channel state information, including receiving a sounding signal set sent by the base station and determining a reference signal resource configuration index according to the sounding signal set, where the reference signal resource configuration index is used to indicate a reference signal resource configuration in reference signal resource configuration set information. The method also includes receiving a reference signal set sent by the base station, where the reference signal set corresponds to the reference signal resource configuration and determining channel state information according to the reference signal set. Additionally, the method includes sending the reference signal resource configuration index and the channel state information to the base station.

20 Claims, 10 Drawing Sheets

Related U.S. Application Data continuation of application No. PCT/CN2014/075089, filed on Apr. 10, 2014.

(51) Int. Cl.

| | | |
|---|---|---|
| *H04L 27/26* | (2006.01) | |
| *H04W 72/04* | (2009.01) | |
| *H04L 5/00* | (2006.01) | |
| *H04W 72/12* | (2009.01) | |
| *H04B 7/0413* | (2017.01) | |
| *H04W 84/04* | (2009.01) | |

(52) U.S. Cl.
CPC ........ *H04L 5/0048* (2013.01); *H04L 27/2613* (2013.01); *H04L 27/2666* (2013.01); *H04W 72/042* (2013.01); *H04W 72/0413* (2013.01); *H04W 72/12* (2013.01); *H04W 84/042* (2013.01)

(56) References Cited

U.S. PATENT DOCUMENTS

| | | | |
|---|---|---|---|
| 9,877,312 B2* | 1/2018 | Kim | H04W 72/042 |
| 2011/0205930 A1 | 8/2011 | Rahman et al. | |
| 2012/0087028 A1 | 4/2012 | Cook | |
| 2012/0276909 A1 | 11/2012 | Xiao et al. | |
| 2013/0003788 A1 | 1/2013 | Marinier et al. | |
| 2013/0051373 A1 | 2/2013 | Ro et al. | |
| 2013/0279437 A1* | 10/2013 | Ng | H04W 48/16 370/329 |
| 2014/0044044 A1 | 2/2014 | Josiam et al. | |
| 2014/0078919 A1 | 3/2014 | Hammarwall | |
| 2014/0119228 A1 | 5/2014 | Wang et al. | |
| 2015/0146561 A1 | 5/2015 | Jung et al. | |
| 2015/0201346 A1 | 7/2015 | Wu et al. | |
| 2016/0013906 A1* | 1/2016 | Guo | H04L 5/0048 370/329 |
| 2016/0043842 A1 | 2/2016 | Gong et al. | |
| 2016/0065278 A1 | 3/2016 | Wang et al. | |
| 2016/0112173 A1 | 4/2016 | Wang et al. | |
| 2017/0005740 A1 | 1/2017 | Yang et al. | |

FOREIGN PATENT DOCUMENTS

| | | |
|---|---|---|
| CN | 102684850 A | 9/2012 |
| CN | 102857279 A | 1/2013 |
| CN | 102869105 A | 1/2013 |
| CN | 103220101 A | 7/2013 |
| CN | 103703815 B | 10/2017 |
| EP | 2717621 A1 | 4/2014 |
| JP | 2013520851 A | 6/2013 |
| JP | 2014502129 A | 1/2014 |
| RU | 2496243 C2 | 10/2013 |
| WO | 2012124552 A1 | 9/2012 |
| WO | 2012153976 A2 | 11/2012 |
| WO | 2013113361 A1 | 8/2013 |
| WO | 2013145552 A1 | 10/2013 |
| WO | 2013184613 A2 | 12/2013 |
| WO | 2014007512 A1 | 1/2014 |
| WO | 2014047797 A1 | 4/2014 |
| WO | 2014179990 A1 | 11/2014 |
| WO | 2014179991 A1 | 11/2014 |
| WO | 2014025699 A1 | 12/2014 |

OTHER PUBLICATIONS

Alcatel-Lucent Shanghai Bell, Alcatel-Lucent, "Considerations on CSI Feedback Enhancements for High-Priority Antenna Configurations", 6.6.2.1, 3GPP TSG-RAN WG1 #66, R1-112420, 7 pages.

Huawei, et al., "WF on Antenna Model in 3D Channel Modeling", 3GPP TSG RAN WG1 #72bis, Chicago, USA, Apr. 15-19, 2013, Agenda Item: 7.2.6.1, R1-131761, 7 pages.

\* cited by examiner

METHOD FOR REPORTING CHANNEL STATE INFORMATION, USER EQUIPMENT, AND BASE STATION

CROSS-REFERENCE TO RELATED APPLICATIONS

This application is a continuation of U.S. patent application Ser. No. 15/289,277, filed on Oct. 10, 2016, now U.S. Pat. No. 10,224,996, which is a continuation of International Application No. PCT/CN2014/075089, filed on Apr. 10, 2014. All of the afore-mentioned patent applications are hereby incorporated by reference in their entireties.

TECHNICAL FIELD

The present disclosure relates to the wireless communications field, and in particular, to a method for reporting channel state information, user equipment, and a base station.

BACKGROUND

Channel state information (CSI) is very important in a modern communications system, and can provide important information for resource scheduling, user transmission format determining, multi-user pairing, and even coordination between multiple cells. In a Long Term Evolution (LTE) system in the 3rd Generation Partnership Project (3GPP), CSI generally includes information such as a channel quality indicator (CQI), a precoding matrix indicator (PMI), and a rank indicator (RI). For a downlink (that is, a base station transmits data to user equipment) system, the user equipment may generally determine CSI according to a reference signal (RS, also referred to as a pilot) sent by the base station, and fed back the CSI to the base station.

Each reference signal generally corresponds to one antenna port. An LTE R8 system can support a configuration of a maximum of four antenna ports by using a cell-specific reference signal (CRS). LTE R10-R11 systems can support a configuration of a maximum of eight antenna ports by using a channel state information reference signal (CSI RS), where "LTE Rx" denotes "LTE of an xth release".

To further improve a system capacity and system coverage, a configuration of more antenna ports is currently considered to be introduced. For example, an antenna configuration of 16, 32, 64, or more antenna ports may be introduced in an active antenna system (AAS) and Massive multiple-input multiple-output (MIMO). On the one hand, each antenna port generally corresponds to one reference signal, and each reference signal needs to occupy a time-frequency resource; therefore, a configuration of more antennas means more resource overheads. On the other hand, more antenna ports mean more corresponding channel measurement that needs to be performed by the user equipment and higher complexity of CSI measurement. Therefore, avoiding excessive resource overheads and excessively high complexity of CSI measurement performed by the user equipment while giving full play to a multi-antenna configuration is now an important problem that is urgent to be resolved.

SUMMARY

Embodiments of the present disclosure provide a method for reporting channel state information, user equipment, and a base station, which can effectively save time-frequency resource overheads, and effectively reduce complexity of channel state information (CSI) measurement performed by the user equipment or improve CSI feedback precision.

A first aspect of an embodiment of the present disclosure provides user equipment. The user equipment includes a sounding signal set receiving module, configured to receive a sounding signal set sent by a base station, where the sounding signal set includes at least one sounding signal and a resource configuration index determining module, configured to determine a reference signal resource configuration index according to the sounding signal set, where the reference signal resource configuration index is used to indicate a reference signal resource configuration in reference signal resource configuration set information. The user equipment also includes a reference signal set receiving module, configured to receive a reference signal set sent by the base station, where the reference signal set corresponds to the reference signal resource configuration indicated by the reference signal resource configuration index and channel state information determining module, configured to determine channel state information according to the reference signal set. Additionally, the user equipment includes a channel state information sending module, configured to send the reference signal resource configuration index and the channel state information to the base station.

In a first possible implementation manner of the first aspect, the user equipment further includes a resource configuration set receiving module, configured to receive the reference signal resource configuration set information sent by the base station, where the reference signal resource configuration set information includes at least two reference signal resource configurations.

With reference to the first aspect and the first possible implementation manner of the first aspect, in a second possible implementation manner of the first aspect, a correspondence between the reference signal resource configuration index and the indicated reference signal resource configuration is predefined or is notified by the base station by using higher layer signaling or downlink control information (DCI).

With reference to the first aspect and the first or second possible implementation manner of the first aspect, in a third possible implementation manner of the first aspect, the sounding signal is a cell-specific reference signal (CRS) or a channel state information reference signal CSI RS, and the reference signal resource configuration index includes a first rank indicator ($RI_1$) and/or a first precoding matrix indicator ($PMI_1$).

With reference to the third possible implementation manner of the first aspect, in a fourth possible implementation manner of the first aspect, the CRS or the channel state information reference signal (CSI RS) is specified by a specific reference signal resource configuration in the reference signal resource configuration set information.

With reference to the first aspect and the first or second possible implementation manner of the first aspect, in a fifth possible implementation manner of the first aspect, the sounding signal is a synchronization signal; and the reference signal resource configuration index is a resource identifier carried in the synchronization signal or associated with a resource location of the synchronization signal, where the resource identifier carried in the synchronization signal or associated with the resource location of the synchronization signal indicates a reference signal resource configuration in the reference signal resource configuration set information.

With reference to the fifth possible implementation manner of the first aspect, in a sixth possible implementation manner of the first aspect, a different resource identifier carried in the synchronization signal is denoted by a different synchronization signal sequence.

With reference to the first aspect and the first or second possible implementation manner of the first aspect, in a seventh possible implementation manner of the first aspect, the sounding signal is a broadcast channel; and the reference signal resource configuration index is a resource identifier carried in the broadcast channel or associated with a resource location of the broadcast channel, where the resource identifier carried in the broadcast channel or associated with the resource location of the broadcast channel indicates a reference signal resource configuration in the reference signal resource configuration set information.

With reference to the seventh possible implementation manner of the first aspect, in an eighth possible implementation manner of the first aspect, a different resource identifier carried in the broadcast channel is denoted by a different cyclic redundancy check mask.

With reference to the first aspect and any one of the first to eighth possible implementation manners of the first aspect, in a ninth possible implementation manner of the first aspect, the channel state information determining module is configured to determine a second precoding matrix indicator ($PMI_2$) according to the reference signal set, where the $PMI_2$ corresponds to a precoding matrix selected from a codebook, and the codebook is determined according to the reference signal resource configuration index; and the channel state information includes the $PMI_2$.

With reference to the first aspect and any one of the first to ninth possible implementation manners of the first aspect, in a tenth possible implementation manner of the first aspect, the channel state information sending module is configured to: send the reference signal resource configuration index and the channel state information to the base station separately on a same subframe or on different subframes.

With reference to the tenth possible implementation manner of the first aspect, in an eleventh possible implementation manner of the first aspect, a period of sending the reference signal resource configuration index by the channel state information sending module is longer than a period of sending the channel state information.

With reference to the first aspect and any one of the first to eleventh possible implementation manners of the first aspect, in a twelfth possible implementation manner of the first aspect, the reference signal resource configuration includes antenna port information and reference signal configuration information and/or reference signal sequence information, where the reference signal configuration information is used to indicate a resource element used for sending a reference signal on an antenna port.

With reference to the twelfth possible implementation manner of the first aspect, in a thirteenth possible implementation manner of the first aspect, the reference signal sequence information is an initial value or cyclic shift information of a reference signal sequence.

With reference to the twelfth or thirteenth possible implementation manner of the first aspect, in a fourteenth possible implementation manner of the first aspect, antenna port sets corresponding to the two reference signal resource configurations have at least one same antenna port.

With reference to the first aspect and the first to fourteenth possible implementation manners of the first aspect, in a fifteenth possible implementation manner of the first aspect, a different antenna port corresponding to each reference signal resource configuration included in the reference signal resource configuration set information uses a different resource reference signal configuration or a different reference signal sequence.

A second aspect of an embodiment of the present disclosure provides a base station, including a sounding signal set sending module, configured to send a sounding signal set to user equipment, where the sounding signal set includes at least one sounding signal, so that the user equipment determines a reference signal resource configuration index according to the sounding signal set, where the reference signal resource configuration index is used to indicate a reference signal resource configuration in reference signal resource configuration set information. The base station also includes a reference signal set sending module, configured to send at least two reference signal sets to the user equipment, where the at least two reference signal sets correspond to at least two reference signal resource configurations included in the reference signal resource configuration set information. Additionally, the base station includes a channel state information receiving module, configured to receive the reference signal resource configuration index and channel state information that are sent by the user equipment, where the channel state information is obtained by the user equipment according to a reference signal resource configuration indicated by the reference signal resource configuration index.

In a first possible implementation manner of the second aspect, the base station further includes: a resource configuration set sending module, configured to send the reference signal resource configuration set information to the user equipment, where the reference signal resource configuration set information includes the at least two reference signal resource configurations.

With reference to the second aspect and the first possible implementation manner of the second aspect, in a second possible implementation manner of the second aspect, a correspondence between the reference signal resource configuration index and the indicated reference signal resource configuration is predefined or is notified to the user equipment by using higher layer signaling or DCI.

With reference to the second aspect and the first or second possible implementation manner of the second aspect, in a third possible implementation manner of the second aspect, the sounding signal is a CRS or a CSI RS; and the reference signal resource configuration index includes an $RI_1$ and/or a $PMI_1$.

With reference to the third possible implementation manner of the second aspect, in a fourth possible implementation manner of the second aspect, the CRS or the CSI RS is specified by a specific reference signal resource configuration in the reference signal resource configuration set information.

With reference to the second aspect and the first or second possible implementation manner of the second aspect, in a fifth possible implementation manner of the second aspect, the sounding signal is a synchronization signal; and the reference signal resource configuration index is a resource identifier carried in the synchronization signal or associated with a resource location of the synchronization signal, where the resource identifier carried in the synchronization signal or associated with the resource location of the synchronization signal indicates a reference signal resource configuration in the reference signal resource configuration set information.

With reference to the fifth possible implementation manner of the second aspect, in a sixth possible implementation manner of the second aspect, a different resource identifier carried in the synchronization signal is denoted by a different synchronization signal sequence.

With reference to the second aspect and the first or second possible implementation manner of the second aspect, in a seventh possible implementation manner of the second aspect, the sounding signal is a broadcast channel; and the reference signal resource configuration index is a resource identifier carried in the broadcast channel or associated with a resource location of the broadcast channel, where the resource identifier carried in the broadcast channel or associated with the resource location of the broadcast channel indicates a reference signal resource configuration in the reference signal resource configuration set information.

With reference to the seventh possible implementation manner of the second aspect, in an eighth possible implementation manner of the second aspect, a different resource identifier carried in the broadcast channel is denoted by a different cyclic redundancy check mask.

With reference to the second aspect and any one of the first to eighth possible implementation manners of the second aspect, in a ninth possible implementation manner of the second aspect, the channel state information includes a $PMI_2$, and the $PMI_2$ is determined by the user equipment according to the reference signal set, and the $PMI_2$ corresponds to a precoding matrix selected by the user equipment from a codebook.

With reference to the second aspect and any one of the first to ninth possible implementation manners of the second aspect, in a tenth possible implementation manner of the second aspect, the channel state information receiving module is configured to: receive, on a same subframe or on different subframes, the reference signal resource configuration index and the channel state information separately that are sent by the user equipment.

With reference to the tenth possible implementation manner of the second aspect, in an eleventh possible implementation manner of the second aspect, a period of receiving, by the channel state information receiving module, the reference signal resource configuration index sent by the user equipment, is longer than a period of receiving the channel state information.

With reference to the second aspect and any one of the first to eleventh possible implementation manners of the second aspect, in a twelfth possible implementation manner of the second aspect, the reference signal resource configuration includes antenna port information and reference signal configuration information and/or reference signal sequence information, where the reference signal configuration information is used to indicate a resource element used for sending a reference signal on an antenna port.

With reference to the twelfth possible implementation manner of the second aspect, in a thirteenth possible implementation manner of the second aspect, the reference signal sequence information is an initial value or cyclic shift information of a reference signal sequence.

With reference to the twelfth or thirteenth possible implementation manner of the second aspect, in a fourteenth possible implementation manner of the second aspect, antenna port sets corresponding to the two reference signal resource configurations have at least one same antenna port.

With reference to the second aspect and the first to fourteenth possible implementation manners of the second aspect, in a fifteenth possible implementation manner of the second aspect, a different antenna port corresponding to each reference signal resource configuration included in the reference signal resource configuration set information uses a different resource reference signal configuration or a different reference signal sequence.

A third aspect of an embodiment of the present disclosure provides a method for reporting channel state information, including: receiving, by user equipment, a sounding signal set sent by a base station, where the sounding signal set includes at least one sounding signal; determining, by the user equipment, a reference signal resource configuration index according to the sounding signal set, where the reference signal resource configuration index is used to indicate a reference signal resource configuration in reference signal resource configuration set information; receiving, by the user equipment, a reference signal set sent by the base station, where the reference signal set corresponds to the reference signal resource configuration indicated by the reference signal resource configuration index; determining, by the user equipment, channel state information according to the reference signal set; and sending, by the user equipment, the reference signal resource configuration index and the channel state information to the base station.

In a first possible implementation manner of the third aspect, the method further includes: receiving, by the user equipment, the reference signal resource configuration set information sent by the base station, where the reference signal resource configuration set information includes at least two reference signal resource configurations.

With reference to the third aspect and the first possible implementation manner of the third aspect, in a second possible implementation manner of the third aspect, a correspondence between the reference signal resource configuration index and the indicated reference signal resource configuration is predefined or is notified by the base station by using higher layer signaling or DCI.

With reference to the third aspect and the first or second possible implementation manner of the third aspect, in a third possible implementation manner of the third aspect, the sounding signal is a CRS or a channel state information reference signal CSI RS; and the reference signal resource configuration index includes an $RI_1$ and/or a $PMI_1$.

With reference to the third possible implementation manner of the third aspect, in a fourth possible implementation manner of the third aspect, the CRS or the CSI RS is specified by a specific reference signal resource configuration in the reference signal resource configuration set information.

With reference to the third aspect and the first or second possible implementation manner of the third aspect, in a fifth possible implementation manner of the third aspect, the sounding signal is a synchronization signal; and the reference signal resource configuration index is a resource identifier carried in the synchronization signal or associated with a resource location of the synchronization signal, where the resource identifier carried in the synchronization signal or associated with the resource location of the synchronization signal indicates a reference signal resource configuration in the reference signal resource configuration set information.

With reference to the fifth possible implementation manner of the third aspect, in a sixth possible implementation manner of the third aspect, a different resource identifier carried in the synchronization signal is denoted by a different synchronization signal sequence.

With reference to the third aspect and the first or second possible implementation manner of the third aspect, in a seventh possible implementation manner of the third aspect, the sounding signal is a broadcast channel; and the reference signal resource configuration index is a resource identifier carried in the broadcast channel or associated with a resource location of the broadcast channel, where the resource identifier carried in the broadcast channel or associated with the resource location of the broadcast channel indicates a reference signal resource configuration in the reference signal resource configuration set information.

With reference to the seventh possible implementation manner of the third aspect, in an eighth possible implementation manner of the third aspect, a different resource identifier carried in the broadcast channel is denoted by a different cyclic redundancy check mask.

With reference to the third aspect and any one of the first to eighth possible implementation manners of the third aspect, in a ninth possible implementation manner of the third aspect, the determining channel state information according to the reference signal set includes: determining, by the user equipment, a $PMI_2$ according to the reference signal set, where the $PMI_2$ corresponds to a precoding matrix selected from a codebook, and the codebook is determined according to the reference signal resource configuration index; and the channel state information includes the $PMI_2$.

With reference to the third aspect and any one of the first to ninth possible implementation manners of the third aspect, in a tenth possible implementation manner of the third aspect, the sending the reference signal resource configuration index and the channel state information to the base station includes: sending, by the user equipment, the reference signal resource configuration index and the channel state information to the base station separately on a same subframe or on different subframes.

With reference to the tenth possible implementation manner of the third aspect, in an eleventh possible implementation manner of the third aspect, a period of sending the reference signal resource configuration index is longer than a period of sending the channel state information.

With reference to the third aspect and any one of the first to eleventh possible implementation manners of the third aspect, in a twelfth possible implementation manner of the third aspect, the reference signal resource configuration includes antenna port information and reference signal configuration information and/or reference signal sequence information, where the reference signal configuration information is used to indicate a resource element used for sending a reference signal on an antenna port.

With reference to the twelfth possible implementation manner of the third aspect, in a thirteenth possible implementation manner of the third aspect, the reference signal sequence information is an initial value or cyclic shift information of a reference signal sequence.

With reference to the twelfth or thirteenth possible implementation manner of the third aspect, in a fourteenth possible implementation manner of the third aspect, antenna port sets corresponding to the two reference signal resource configurations have at least one same antenna port.

With reference to the third aspect and the first to fourteenth possible implementation manners of the third aspect, in a fifteenth possible implementation manner of the third aspect, a different antenna port corresponding to each reference signal resource configuration included in the reference signal resource configuration set information uses a different resource reference signal configuration or a different reference signal sequence.

A fourth aspect of an embodiment of the present disclosure provides a method for reporting channel state information, including: sending, by a base station, a sounding signal set to user equipment, where the sounding signal set includes at least one sounding signal, so that the user equipment determines a reference signal resource configuration index according to the sounding signal set, where the reference signal resource configuration index is used to indicate a reference signal resource configuration in reference signal resource configuration set information; sending, by the base station, at least two reference signal sets to the user equipment, where the at least two reference signal sets correspond to at least two reference signal resource configurations included in the reference signal resource configuration set information; and receiving, by the base station, the reference signal resource configuration index and channel state information that are sent by the user equipment, where the channel state information is obtained by the user equipment according to a reference signal resource configuration indicated by the reference signal resource configuration index.

In a first possible implementation manner of the fourth aspect, the method further includes: sending, by the base station, the reference signal resource configuration set information to the user equipment, where the reference signal resource configuration set information includes the at least two reference signal resource configurations.

With reference to the fourth aspect and the first or second possible implementation manner of the fourth aspect, in a third possible implementation manner of the fourth aspect, the sounding signal is a CRS or a channel state information reference signal CSI RS; and the reference signal resource configuration index includes an $RI_1$ and/or a $PMI_1$.

With reference to the third possible implementation manner of the fourth aspect, in a fourth possible implementation manner of the fourth aspect, the CRS or the CSI RS is specified by a specific reference signal resource configuration in the reference signal resource configuration set information.

With reference to the fourth aspect and the first or second possible implementation manner of the fourth aspect, in a fifth possible implementation manner of the fourth aspect, the sounding signal is a synchronization signal; and the reference signal resource configuration index is a resource identifier carried in the synchronization signal or associated with a resource location of the synchronization signal, where the resource identifier carried in the synchronization signal or associated with the resource location of the synchronization signal indicates a reference signal resource configuration in the reference signal resource configuration set information.

With reference to the fifth possible implementation manner of the fourth aspect, in a sixth possible implementation manner of the fourth aspect, a different resource identifier carried in the synchronization signal is denoted by a different synchronization signal sequence.

With reference to the fourth aspect and the first or second possible implementation manner of the fourth aspect, in a seventh possible implementation manner of the fourth aspect, the sounding signal is a broadcast channel; and the reference signal resource configuration index is a resource identifier carried in the broadcast channel or associated with a resource location of the broadcast channel, where the resource identifier carried in the broadcast channel or associated with the resource location of the broadcast channel indicates a reference signal resource configuration in the reference signal resource configuration set information.

With reference to the seventh possible implementation manner of the fourth aspect, in an eighth possible implementation manner of the fourth aspect, a different resource identifier carried in the broadcast channel is denoted by a different cyclic redundancy check mask.

With reference to the fourth aspect and any one of the first to eighth possible implementation manners of the fourth aspect, in a ninth possible implementation manner of the fourth aspect, the channel state information includes a $PMI_2$, and the $PMI_2$ is determined by the user equipment according to the reference signal set, and the $PMI_2$ corresponds to a precoding matrix selected by the user equipment from a codebook.

With reference to the fourth aspect and any one of the first to ninth possible implementation manners of the fourth aspect, in a tenth possible implementation manner of the fourth aspect, the receiving the reference signal resource configuration index and channel state information that are sent by the user equipment includes: receiving, by the base station on a same subframe or on different subframes, the reference signal resource configuration index and the channel state information separately that are sent by the user equipment.

With reference to the tenth possible implementation manner of the fourth aspect, in an eleventh possible implementation manner of the fourth aspect, a period of receiving the reference signal resource configuration index sent by the user equipment is longer than a period of receiving the channel state information.

With reference to the fourth aspect and any one of the first to eleventh possible implementation manners of the second aspect, in a twelfth possible implementation manner of the second aspect, the reference signal resource configuration includes antenna port information and reference signal configuration information and/or reference signal sequence information, where the reference signal configuration information is used to indicate a resource element used for sending a reference signal on an antenna port.

With reference to the twelfth possible implementation manner of the fourth aspect, in a thirteenth possible implementation manner of the fourth aspect, the reference signal sequence information is an initial value or cyclic shift information of a reference signal sequence.

With reference to the twelfth or thirteenth possible implementation manner of the fourth aspect, in a fourteenth possible implementation manner of the fourth aspect, antenna port sets corresponding to the two reference signal resource configurations have at least one same antenna port.

With reference to the fourth aspect and the first to fourteenth possible implementation manners of the fourth aspect, in a fifteenth possible implementation manner of the fourth aspect, a different antenna port corresponding to each reference signal resource configuration included in the reference signal resource configuration set information uses a different resource reference signal configuration or a different reference signal sequence.

A fifth aspect of an embodiment of the present disclosure provides a communications system, including the user equipment provided in the first aspect and the base station provided in the second aspect, where the user equipment is configured to: receive a sounding signal set sent by the base station, where the sounding signal set includes at least one sounding signal; determine a reference signal resource configuration index according to the sounding signal set, where the reference signal resource configuration index is used to indicate a reference signal resource configuration in reference signal resource configuration set information; receive a reference signal set sent by the base station, where the reference signal set corresponds to the reference signal resource configuration indicated by the reference signal resource configuration index; determine channel state information according to the reference signal set; and send the reference signal resource configuration index and the channel state information to the base station; and the base station is configured to: send a sounding signal set to the user equipment, where the sounding signal set includes at least one sounding signal, so that the user equipment determines a reference signal resource configuration index according to the sounding signal set, where the reference signal resource configuration index is used to indicate a reference signal resource configuration in reference signal resource configuration set information; send at least two reference signal sets to the user equipment, where the at least two reference signal sets correspond to at least two reference signal resource configurations included in the reference signal resource configuration set information; and receive the reference signal resource configuration index and channel state information that are sent by the user equipment, where the channel state information is obtained by the user equipment according to a reference signal resource configuration indicated by the reference signal resource configuration index.

It can be learned from the foregoing description that, in the embodiments of the present disclosure, a base station sends a sounding signal set to user equipment, and the user equipment determines a locally appropriate reference signal resource configuration index according to the sounding signal set, where the reference signal resource configuration index is used to indicate a reference signal resource configuration in reference signal resource configuration set information. When the base station sends a reference signal set to the outside, the user equipment obtains only a reference signal set corresponding to the reference signal resource configuration indicated by the reference signal resource configuration index, and then determines channel state information according to the reference signal set and reports the channel state information to the base station. This can effectively save time-frequency resource overheads, and effectively reduce complexity of CSI measurement performed by the user equipment or improve CSI feedback precision.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD) system, a Universal Mobile Telecommunications System (UMTS), or a Worldwide Interoperability for Microwave Access (WiMAX) communications system.

It should also be understood that in the embodiments of the present disclosure, user equipment (UE) may be referred to as a terminal, a mobile station (MS), a mobile terminal, or the like. The user equipment may communicate with one or more core networks by using a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present disclosure, a base station may be a base transceiver station (BTS) in the GSM or CDMA, or may be a nodeB (NB) in the WCDMA, or may be an evolved NodeB (eNB) in the LTE, which is not limited in the present disclosure. However, for ease of description, the following embodiments are described by using an eNB as an example.

Figure 1A:
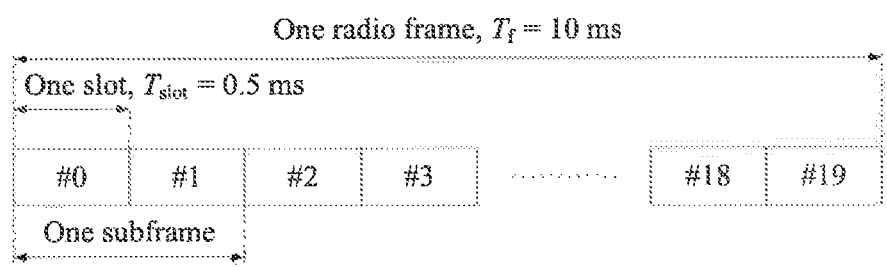
FIG. 1a is a schematic diagram of a frame structure according to an embodiment of the present disclosure.
Figure 1B:
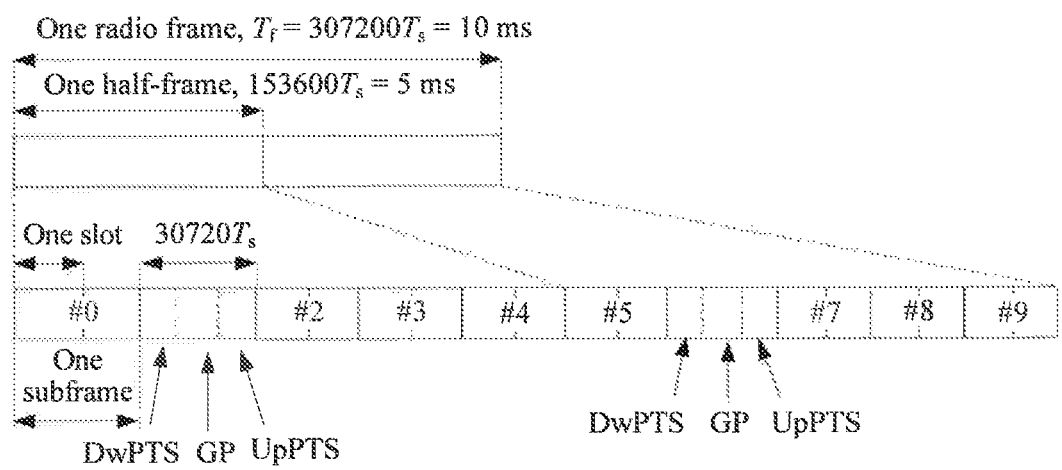
FIG. 1b is a schematic diagram of another frame structure according to an embodiment of the present disclosure.

For ease of understanding, an LTE system is used as an example to describe a frame structure, a timeslot structure, and a resource grid structure first. In the LTE system, uplink and downlink transmission is organized into a radio frame. Each radio frame is 10 milliseconds long, and each radio frame includes 10 1-millisecond subframes or includes 20 0.5-millisecond timeslots (slot) numbered from 0 to 19. One subframe is defined as two consecutive timeslots. There are two frame structures, type 1 and type 2, which are respectively applied to an FDD system and a TDD system. Frame structure type 1 (FS1) and frame structure type 2 (FS2) are shown in FIG. 1a and FIG. 1b respectively. In addition, in FIG. 1b, half-frame denotes a half radio frame, DwPTS denotes a downlink pilot timeslot, UpPTS denotes an uplink pilot timeslot, and Gp denotes a guard interval between the uplink pilot timeslot and the downlink pilot timeslot.

Figure 1C:
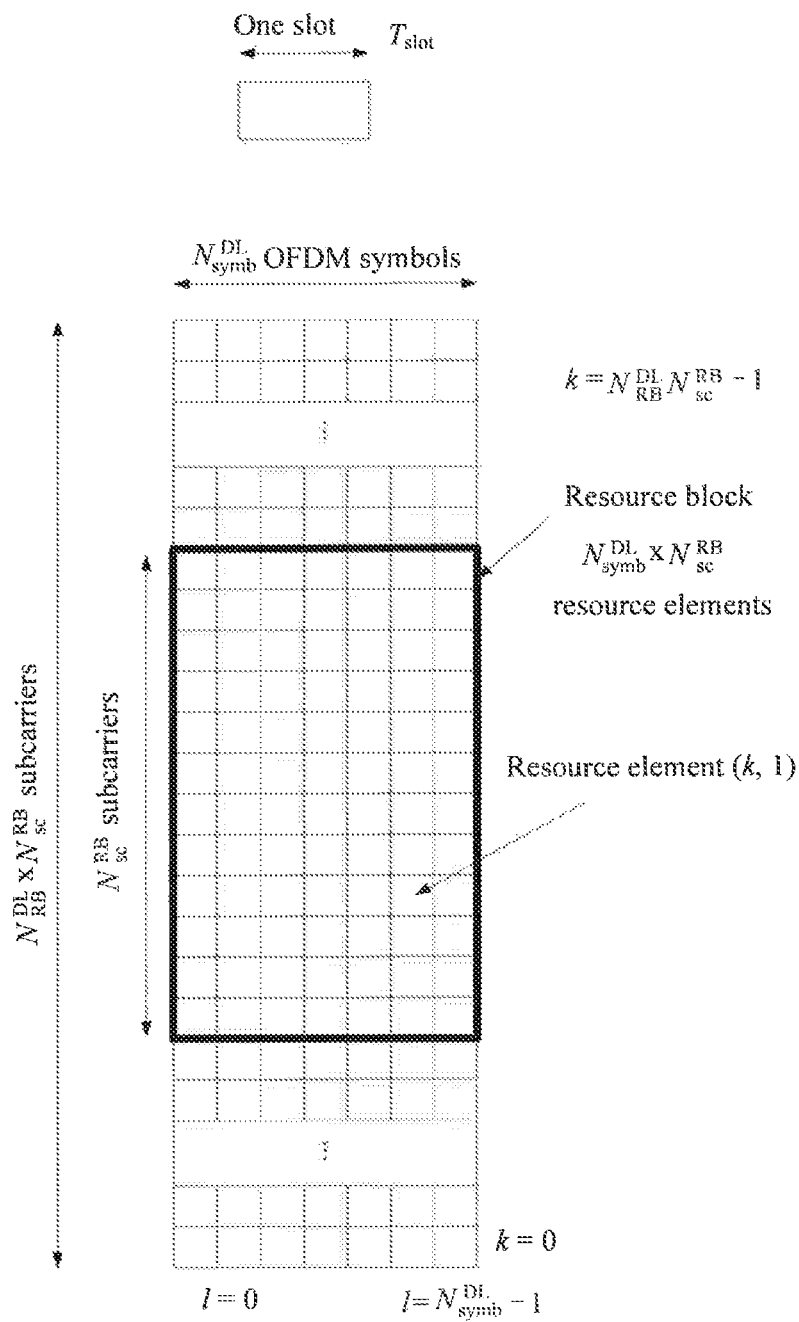
FIG. 1c is a schematic structural diagram of a resource grid according to an embodiment of the present disclosure.

One subframe is defined as two consecutive timeslots. A signal transmitted in each timeslot may be denoted by one or more resource grids. As shown in FIG. 1c, a resource block denotes a resource grid (RB). Using a downlink system as an example, $N_{RB}^{DL}N_{sc}^{RB}$ consecutive subcarriers and $N_{symb}^{DL}$ consecutive OFDM symbols form a resource grid structure, where $N_{RB}^{DL}N_{sc}^{RB}$ and $N_{symb}^{DL}$ are respectively a frequency-domain metric identifier and a time-domain metric identifier in an LTE physical layer protocol, $N_{RB}^{DL}$ is a system bandwidth expressed in units of resource blocks RBs, $N_{sc}^{RB}$ is a quantity of subcarriers in an RB, and $N_{symb}^{DL}$ is a quantity of OFDM symbols in a downlink timeslot. Each element in a resource grid is referred to as a resource element (RE), and each RE may be uniquely identified by an index pair (k,l) in a timeslot, where $k=0, \ldots, N_{sc}^{RB}-1$ is a frequency domain index in the timeslot, and $l=0, \ldots, N_{symb}^{DL}-1$ is a time domain index in the timeslot. $N_{symb}^{DL}$ consecutive OFDM symbols in the time domain and $N_{sc}^{RB}$ consecutive subcarriers in the frequency domain are defined as a resource block (RB).

Figure 1D:
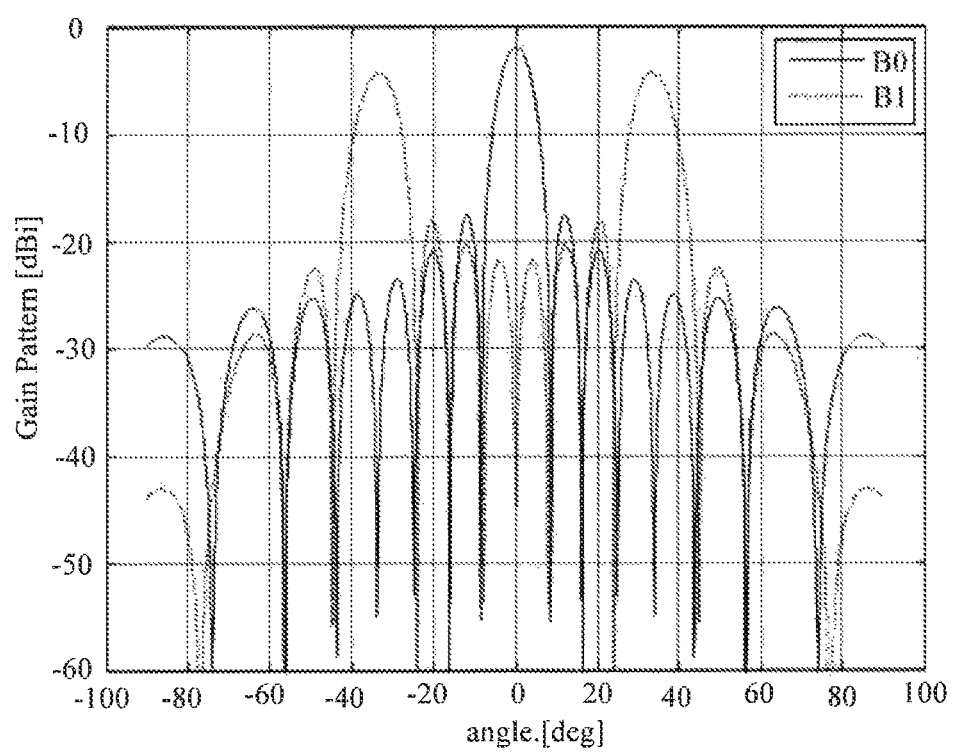
FIG. 1d is a schematic diagram of a directive gain of a beam according to an embodiment of the present disclosure.

In addition, an antenna port is defined by the LTE system so that a channel over which a symbol on the antenna port is sent can be inferred from a channel over which another symbol on the same antenna port is sent. Each antenna port has a resource grid. Actually, each antenna port may correspond to one physical antenna, or correspond to one virtual antenna, that is, a combination of multiple physical antennas. Each antenna port may have a same or different antenna directivity pattern. For example, antenna ports of different beam directivities or beam widths are obtained by changing a horizontal tilt angle or vertical tilt angle of a different antenna array or by means of weighting or phase shifting of a different combination of multiple physical antennas. As shown in FIG. 1d, B0 and B1 are directivity patterns of two antenna ports of different beam directivities, where angle denotes a tilt angle of a beam directivity (unit: dB), and Gain Pattern denotes a gain (unit: deg).

It should be pointed out that the present disclosure is not limited to the foregoing composition of a frame structure, a timeslot structure, and a physical resource element. For example, in a future high-frequency system, a frame structure may include more timeslots or OFDM symbols, or the subcarrier spacing is wider. For example, one radio frame structure may include 40 or 80 timeslots, or the subcarrier spacing is 60 kHz.

Figure 4:
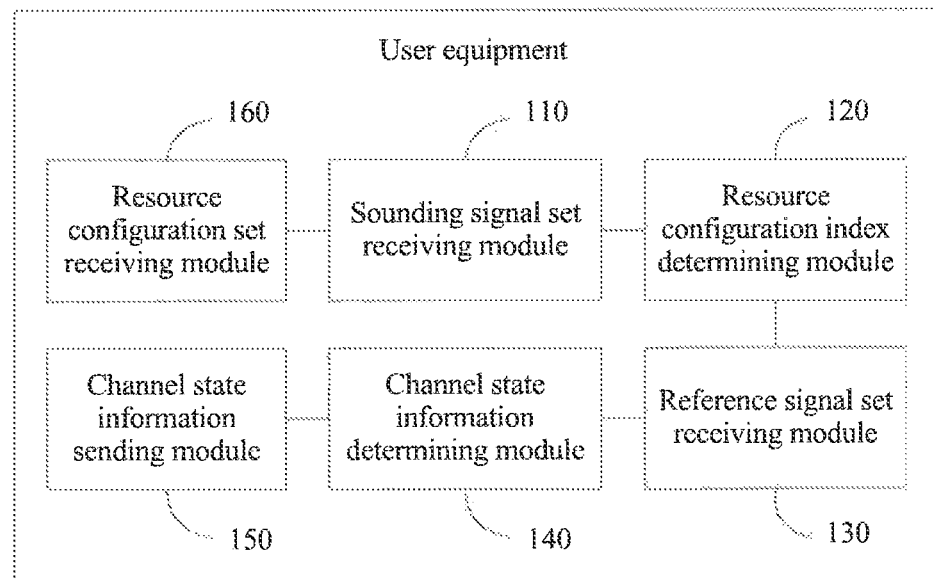
FIG. 4 is a schematic structural diagram of user equipment according to an embodiment of the present disclosure.

FIG. 4 is a schematic structural diagram of user equipment according to an embodiment of the present disclosure. As shown in the figure, the user equipment in this embodiment of the present disclosure may include at least a sounding signal set receiving module 110, a resource configuration index determining module 120, a reference signal set receiving module 130, a channel state information determining module 140, and a channel state information sending module 150.

The sounding signal set receiving module 110 is configured to receive a sounding signal set sent by the base station, where the sounding signal set includes at least one sounding signal.

Specifically, the sounding signal set receiving module 110 receives the sounding signal set sent by the base station, where the sounding signal set includes at least one sounding signal. It should be pointed out that:

In a first optional implementation manner, the sounding signal is a CRS (Cell-Specific Reference Signal) or a CSI RS (Channel State Information Reference Signal). The CRS may support a cell-specific antenna port configuration, and is received by all user equipments in this cell. For example, the CRS may be a reference signal corresponding to an antenna port 0, 1, 2, or 3 in an LTE R8 system. The CSI RS supports signal transmission on a cell-specific antenna port and signal receiving on a user equipment specific antenna port. For example, the CSI RS may be a reference signal corresponding to an antenna port 15, 16, . . . , or 22 in an LTE R10 system. It should be pointed out that the CRS or the CSI RS is not limited to a current LTE system.

In a second optional implementation manner, the sounding signal is a synchronization signal. The synchronization signal is used to implement time and frequency synchronization. one of multiple known or optional synchronization signal sequences is mapped to a resource element set of a synchronization signal. According to the known or optional synchronization signal sequence, the user equipment may implement time and frequency synchronization by detecting the synchronization signal.

Specifically, the synchronization signal may be sent on at least one resource element set separately. For example, using a frame structure in an LTE system as an example, the at least one resource element set may be:

$$S_0^{SS} = \left\{(k, l, n_s) \mid k = n - \frac{N_{SS}}{2} + \frac{N_{RB}^{DL} N_{sc}^{RB}}{2}, n = 0, \right. \quad (1)$$

$$\left. \ldots, N_{SS} - 1; l = N_{symb}^{RB} - 1; n_s \bmod N_{slot}^F = 0, \frac{N_{slot}^F}{2}\right\}$$

$$S_1^{SS} = \left\{(k, l, n_s) \mid k = n - \frac{N_{SS}}{2} + \frac{N_{RB}^{DL} N_{sc}^{RB}}{2}, n = 0, \ldots, \right. \quad (2)$$

$$\left. N_{SS} - 1; l = N_{symb}^{RB} - 1; n_s \bmod N_{slot}^F = \frac{N_{slot}^F}{4}, \frac{3N_{slot}^F}{4}\right\}$$

The triplet $(k,l,n_s)$ denotes a location of a resource element used for the synchronization signal, where $k$, $l$, and $n_s$ are respectively a subcarrier index, an OFDM symbol index, and a timeslot index of the resource element; $N_{SS}$ denotes a length of a synchronization signal sequence.

Specifically, in each resource element set, the synchronization signal sends a synchronization signal sequence. The synchronization signal sequence may be a Zadoff-Chu (ZC) sequence. Using $N_{SS}=62$ as an example, the synchronization signal sequence is the following ZC sequence:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad (3)$$

or a cyclic shift (Cyclic Shift) of the ZC sequence:

$$d_{u,v}(n) = d_u((n+v) \bmod N_{SS}) \quad (4)$$

The parameter U is a root index of the ZC sequence, and its value may be, for example, 25, 29, or 34. The parameter v is a cyclic shift value, and its value may be, for example, a positive integer such as 3 or 6.

Optionally, the synchronization signal sequence may also be an m sequence or a Gold sequence or a combination thereof, and is not further enumerated herein.

Specifically, the synchronization signal sequence may be separately mapped to different resource element sets. Using the ZC sequence whose length is 62 as an example, 62 elements in the sequence may be mapped to 62 resource element locations respectively. For example, a sequence element in an RE location $(k,l,n_s)$ in the resource element set $S_i^{SS}$ is:

$$a_{k,l,n_s} = d_{u_i}(n), (k,l,n_s) \in S_i^{SS} \quad (5)$$

or $$a_{k,l,n_s} = d_{u_i,v_i}(n), (k,l,n_s) \in S_i^{SS}, i = 0, 1, \ldots \quad (6)$$

where $u_i$ and $v_i$ are respectively a root index value and a cyclic shift value of a ZC sequence used for the synchronization signal on the resource element set $S_i^{SS}$. A synchronization signal on a different resource element set $S_i^{SS}$ may use a different root index value or a different cyclic shift value or a combination thereof. It should be pointed out that a different $u_i$ or $v_i$ or a combination $(u_i, v_i)$ thereof may correspond to a different piece of information, so that the synchronization signal sent on the different resource element sets carries different information.

In a third optional implementation manner, the sounding signal is a broadcast channel. The broadcast channel is used to send a broadcast message. The broadcast message may include, for example, a system bandwidth, a system frame number, physical channel configuration indication information, or a combination thereof.

Specifically, the broadcast channel may be sent on at least one resource element set separately. For example, using a frame structure in an LTE system as an example, the at least one resource element set may be:

$$S_0^{BCH} = \left\{(k, l, n_s, n_f) \mid k = \frac{N_{RB}^{DL} N_{sc}^{RB}}{2} - 36 + k', k' = 0, \right. \quad (7)$$

$$\left. 1, \ldots, 71; l = 0, 1, 2, 3; n_s = 1, n_f \bmod(4N) = j\right\}$$

$$S_1^{BCH} = \left\{(k, l, n_s, n_f) \mid k = \frac{N_{RB}^{DL} N_{sc}^{RB}}{2} - 36 + k', k' = 0, \right. \quad (8)$$

$$\left. 1, \ldots, 71; l = 4, 5, 6; n_s = 1, n_f \bmod(4N) = j\right\} \text{ or}$$

$$S_0^{BCH} = \left\{(k, l, n_s, n_f) \mid k = \frac{N_{RB}^{DL} N_{sc}^{RB}}{2} - 36 + k', k' = 0, \right. \quad (9)$$

$$\left. 1, \ldots, 71; l = 0, 1, 2, 3; n_s = 1, n_f \bmod(4N) = j_0\right\}$$

$$S_1^{BCH} = \left\{(k, l, n_s, n_f) \mid k = \frac{N_{RB}^{DL} N_{sc}^{RB}}{2} - 36 + k', k' = 0, \right. \quad (10)$$

$$\left. 1, \ldots, 71; l = 0, 1, 2, 3; n_s = 1, n_f \bmod(4N) = j_1\right\}$$

The quadruplet $(k,l,n_s,n_f)$ denotes a location of a resource element used for the broadcast channel, where $k$, $l$, $n_s$, and $n_f$ are respectively a subcarrier index, an OFDM symbol index, a timeslot index, and a system frame number of the resource element; $j_0 \neq j_1$, and value ranges of all parameters $j$, $j0$, and $j1$ are 0 to $4N-1$. The positive integer N in formulas (7) to (10) may be 1 or a positive integer greater than 1.

Specifically, a broadcast channel sent by each resource element group may be mapped to a corresponding resource element set after undergoing channel coding (for example, by using a convolutional code or a Turbo code) and modulation. In addition, before channel coding, a cyclic redundancy check (CRC) code may be appended to the broadcast message.

Optionally, the broadcast channels in the different resource element sets may further carry additional information separately in addition to the system broadcast information. Optionally, an implementation manner may be:

Manner 1: The additional information and the broadcast information form a broadcast message, and undergo processing such as channel coding.

Manner 2: The additional information is denoted by a different CRC mask. Specifically, a CRC check bit corresponding to the broadcast message carried in the broadcast channel is $p_n$, n=0, 1, 2, ..., NCRC−1, and a CRC mask corresponding to the indication information is $x_n$, n=0, 1, 2, ..., NCRC−1. Therefore, after CRC mask scrambling, the following bit sequence is generated:

$$c_k = (p_n + x_n) \bmod 2, n = 0,1,2,\ldots,\text{NCRC}-1 \quad (11)$$

For example, when NCRC=16 or 24, four different CRC masks may be respectively:

$$X_1 = \{x_n | x_n = 0, n = 0, \ldots, N_{CRC}-1\} \quad (12)$$

$$X_2 = \{x_n | x_n = 1, n = 0, \ldots, N_{CRC}-1\} \quad (13)$$

$$X_3 = \{x_n | x_n = n \bmod 2, n = 0, \ldots, N_{CRC}-1\} \quad (14)$$

$$X_4 = \{x_n | x_n = (n+1) \bmod 2, n = 0, \ldots, N_{CRC}-1\} \quad (15)$$

It should be specially noted that the foregoing three implementation manners merely show three specific sounding signal types proposed in this embodiment of the present disclosure. However, type of the sounding signal is not limited thereto, and is not enumerated exhaustively herein.

The resource configuration index determining module 120 is configured to determine a reference signal resource configuration index according to the sounding signal set, where the reference signal resource configuration index is used to indicate a reference signal resource configuration in reference signal resource configuration set information.

Specifically, the resource configuration index determining module 120 determines the reference signal resource configuration index according to the received sounding signal set.

It should be pointed out that the reference signal resource configuration index is used to indicate a reference signal resource configuration in the reference signal resource configuration set information. Generally, each reference signal corresponds to one antenna port. By means of a least square (LS) method, a minimum mean squared error (MMSE) method, or the like, a channel estimation on a corresponding antenna port may be obtained according to a resource element location occupied by each reference signal in a resource grid of the corresponding antenna port.

Figure 2A:
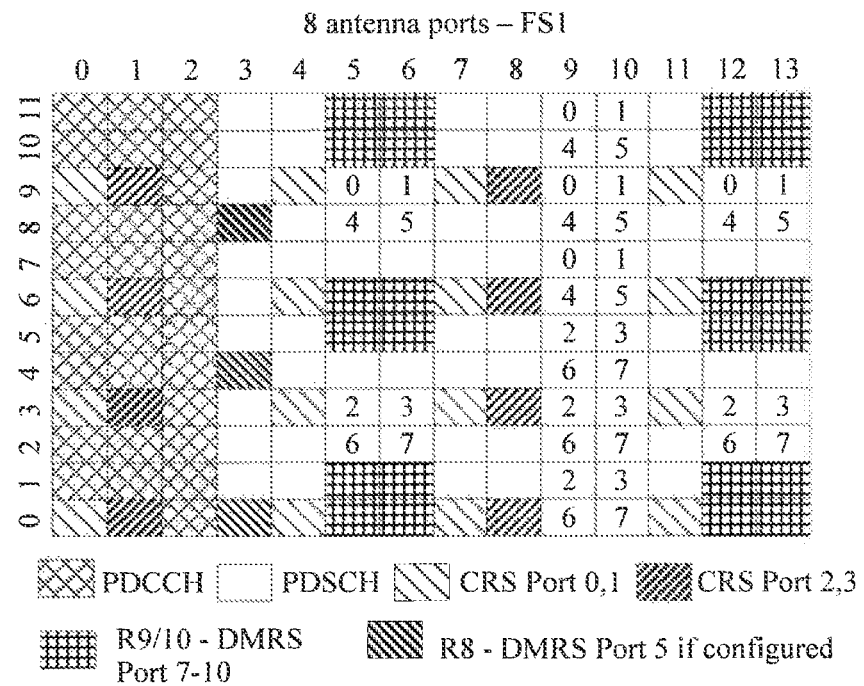
FIG. 2a is a schematic diagram of a reference signal configuration with 8 antenna ports according to an embodiment of the present disclosure.
Figure 2B:
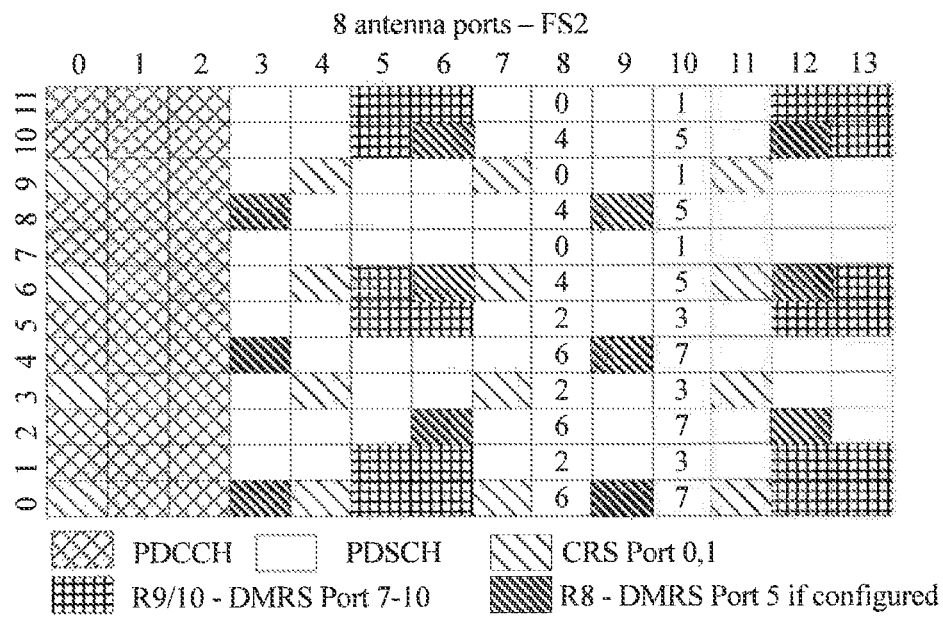
FIG. 2b is a schematic diagram of another reference signal configuration with 8 antenna ports according to an embodiment of the present disclosure.
Figure 3A:
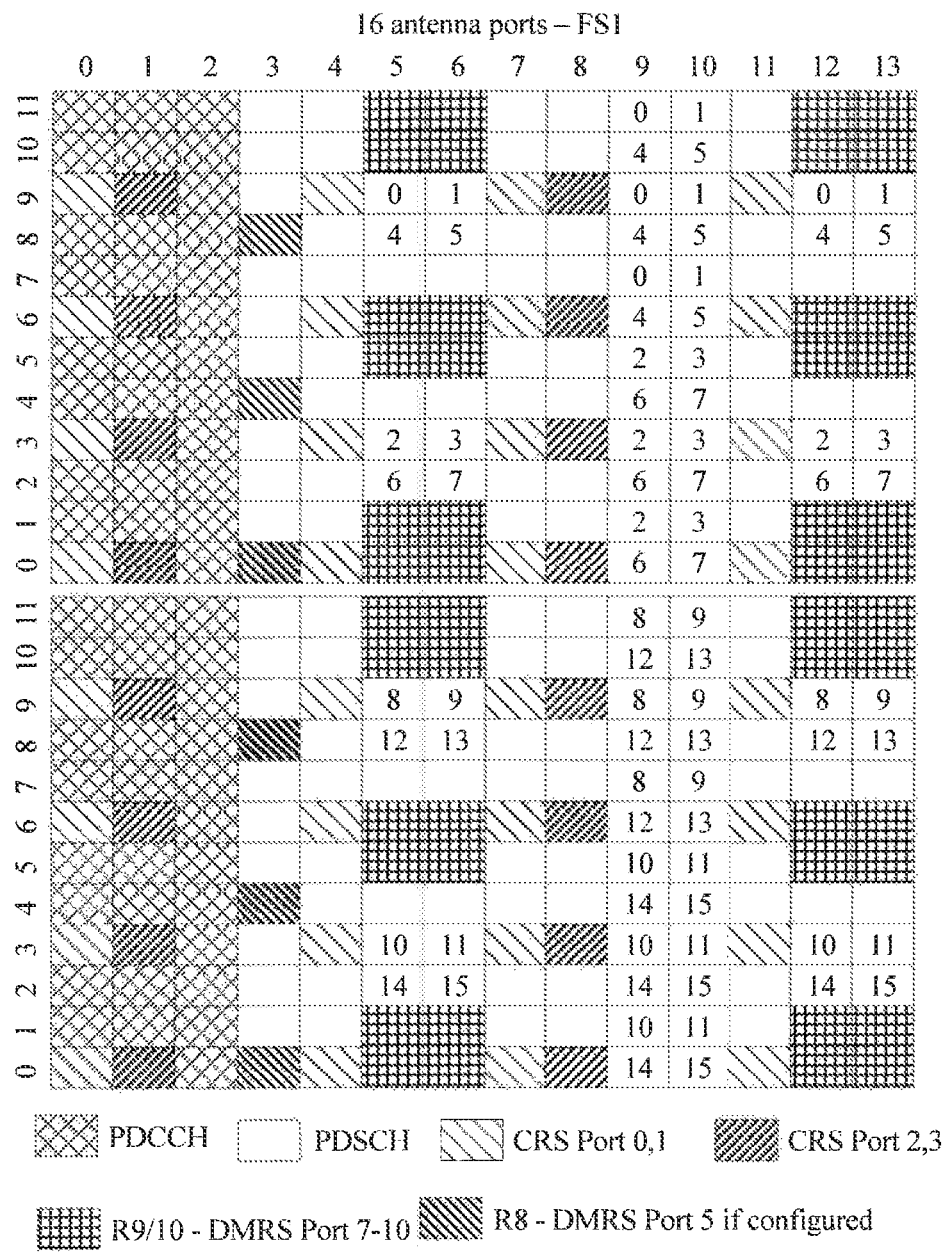
FIG. 3a is a schematic diagram of a reference signal configuration with 16 antenna ports according to an embodiment of the present disclosure.
Figure 3B:
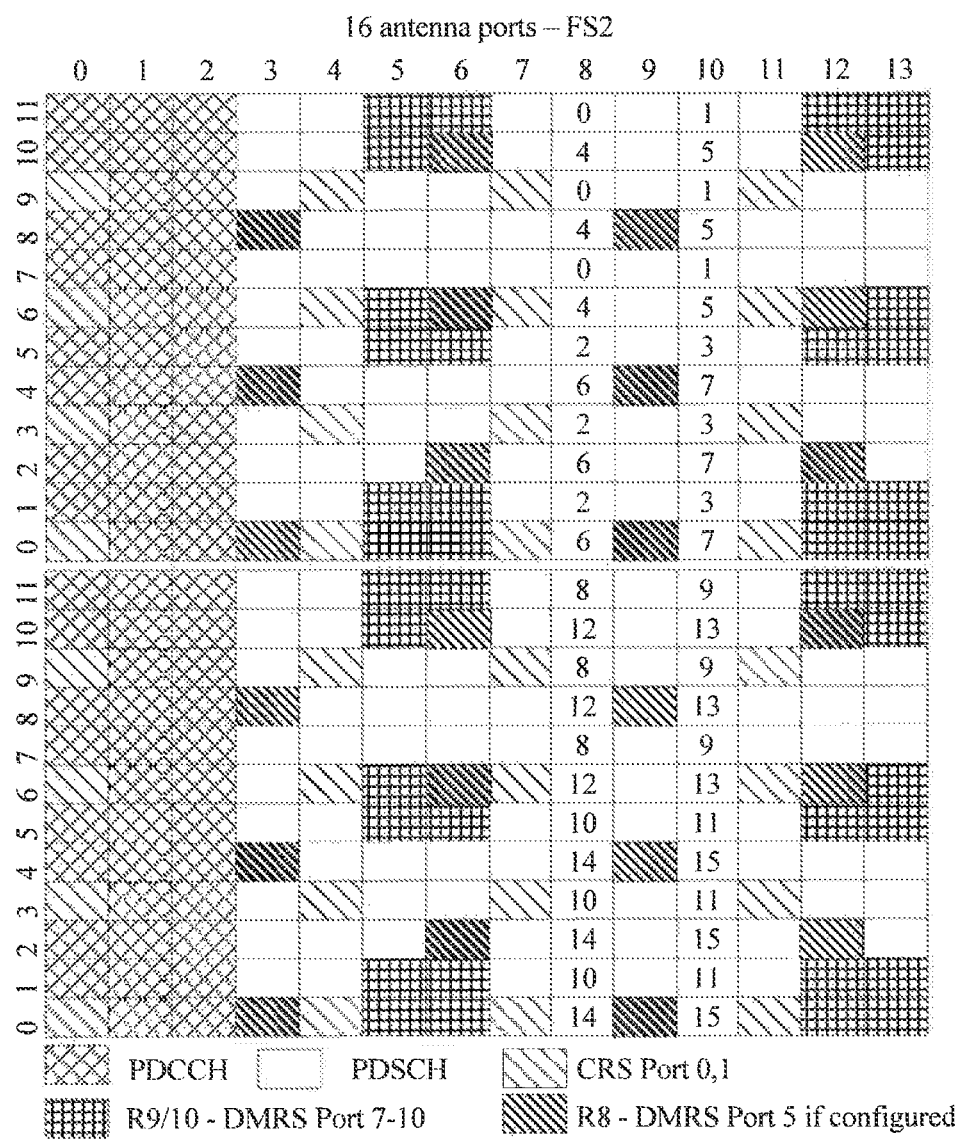
FIG. 3b is a schematic diagram of another reference signal configuration with 16 antenna ports according to an embodiment of the present disclosure.

Specifically, the reference signal resource configuration may include information such as a supported quantity of antenna ports, a reference signal sending period and an offset in the sending period, an RE location occupied by a reference signal, or a reference signal sequence. The RE location occupied by the reference signal or a time-frequency pattern of the reference signal is generally referred to as a reference signal configuration. Using 8 antenna ports as an example, RE locations corresponding to the 8 antenna ports in frame structures FS1 and FS2 are shown in FIG. 2a and FIG. 2b respectively. Using 16 antenna ports as an example, RE locations corresponding to the 16 antenna ports in the frame structures FS1 and FS are shown in FIG. 3a and FIG. 3b respectively. Using FIG. 3a as an example, RE locations denoted by digits 0, 1, ..., 7 in the figure are locations occupied by reference signals. In FIG. 2a, FIG. 2b, FIG. 3a, and FIG. 3b, PDCCH (Physical Downlink Control Channel) is a physical downlink control channel, and may carry downlink control information; PDSCH (Physical Downlink Shared Channel) is a physical downlink shared channel, and may carry data of a transmission channel; CRS port denotes a port to which the cell-specific reference signal belongs, and DMRS (Demodulation Reference Signal) is a demodulation reference signal.

Specifically, the reference signal sends a reference signal sequence on an occupied resource element set. Optionally, the reference signal sequence may be a ZC sequence or an m sequence, or may be obtained according to a combination of two base sequences or according to a pseudo random sequence, or the like.

For example, the reference signal sequence may be generated according to a pseudo random sequence, for example:

$$r_{l,n_s}(m) = \frac{1}{\sqrt{2}}(1 - 2 \cdot c(2m)) + j\frac{1}{2}(1 - 2 \cdot c(2m+1)), \quad (16)$$

$$m = 0, 1, \ldots, N_{RB}^{max,DL} - 1$$

$$c(n) = (x_1(n + N_c) + x_2(n + N_c)) \bmod 2 \quad (17)$$

$$x_1(n + 31) = (x_1(n + 3) + x_1(n)) \bmod 2 \quad (18)$$

$$x_2(n + 31) = (x_2(n + 3) + x_2(n + 2) + x_2(n + 1) + x_2(n)) \bmod 2 \quad (19)$$

where $n_s$ is a timeslot number in a radio frame, and l is an OFDM symbol number in a timeslot. An initial value of the pseudo random sequence c(i) may be set according to specific implementation.

Optionally, the reference signal sequence may be obtained by means of cyclic shift according to a root sequence, for example, obtained according to the following formula:

$$r_{l,n_s}(m) = x_u((m+v) \bmod N_{ZC}^{RS}) \quad (20)$$

The base sequence is generated according to $r_u(n) = x_u(n \bmod N_{ZC}^{RS})$, where $x_u(n)$ is a root sequence of a root index value u, $N_{RS}$ is a length of the reference signal sequence, and v is a CS value.

Optionally, the reference signal sequence may be obtained according to a combination of two base sequences, for example, obtained according to the following formula:

$$r_{l,n_s}(m) = r(m)x_u(m) \quad (21)$$

where $r(m) = e^{j\alpha m}$ and $\alpha = 2\pi n_{cs}/M$, $0 \le n_{cs} < M$.

Specifically, for a different sounding signal type, the resource configuration index determining module 120 determines the reference signal resource configuration index according to the sounding signal set in the following specific implementation manners:

Type 1: The sounding signal is a CRS or a channel state information reference signal CSI RS, and the reference signal resource configuration index includes a first rank indicator (RI1) and/or a PMI1. Specifically, the determining, by the resource configuration index determining module 120, the RI1 and/or the PMI1 according to the CRS or the CSI RS includes: obtaining, by the resource configuration index determining module 120, a channel estimation value according to the CRS or the CSI RS; and selecting, by the resource configuration index determining module 120, through the obtained channel estimation value, a first precoding matrix from a first codebook according to a preset criterion, where the first precoding matrix corresponds to the RI1 and/or the PMI1.

The channel estimation may be implemented according to the prior art, for example, by using the LS method or the minimum mean squared error method.

The preset criterion may be a criterion such as capacity maximization or mutual information maximization or throughput maximization, which is not limited in the present disclosure.

The first codebook is a precoding matrix set, in which each first precoding matrix is referred to as a codeword, and each codeword may be indicated by the RI1 and/or the PMI1.

Optionally, in an embodiment, the resource configuration index determining module 120 determines that a precoding matrix included in the first codebook used by the first precoding matrix is a precoding matrix in a 2-antenna codebook, a 4-antenna codebook, or an 8-antenna codebook in the LTE R10 system, or is a precoding matrix in a 2-antenna codebook, a 4-antenna codebook, or an 8-antenna codebook in an LTE R12 system.

In this embodiment of the present disclosure, optionally, as an example, a precoding matrix included in the first codebook is a discrete Fourier transform (DFT) matrix, a Hadamard matrix, a Householder matrix, a kronecker product of two DFT matrices, a kronecker product of a DFT matrix and a Hadamard matrix, or a kronecker product of a DFT matrix and a Householder matrix.

It should be pointed out that the precoding matrix in the first codebook may be pre-stored on a user equipment side or on a base station side, or may be calculated according to a structure of the precoding matrix, for example, calculated according to a relationship between the first precoding matrix indicator and the precoding matrix, which, however, is not limited in the present disclosure.

Selecting a precoding matrix according to a channel estimation by using a preset criterion is the prior art, and is not further described herein.

A correspondence between the RI1 and/or the PMI1 included in the reference signal resource configuration index and the reference signal resource configuration information may be predefined or may be notified by the base station to the user equipment by using higher layer signaling such as RRC signaling or downlink control information (DCI), which is specifically shown in Table 1 or Table 2.

TABLE 1

| Precoding matrix indicator PMI$_1$ | Antenna port information | Reference signal configuration information | Reference signal sequence information |
|---|---|---|---|
| | | Reference signal resource configuration | |
| 0 | 8 | 0 | 0 |
| 1 | 8 | 0 | 1 |
| 2 | 8 | 1 | 0 |
| 3 | 8 | 1 | 1 |
| 4 | 8 | 2 | 0 |
| 5 | 8 | 2 | 1 |
| 6 | 8 | 3 | 0 |
| 7 | 8 | 3 | 1 |

TABLE 2

| Rank indicator RI | Precoding matrix indicator PMI$_1$ | Antenna port information | Reference signal configuration information | Reference signal sequence information |
|---|---|---|---|---|
| | | | Reference signal resource configuration | |
| 1 | 0 | 8 | 0 | 0 |
| | 1 | 8 | 0 | 1 |
| | 2 | 8 | 1 | 0 |
| | 3 | 8 | 1 | 1 |
| | 4 | 8 | 2 | 0 |
| | 5 | 8 | 2 | 1 |
| | 6 | 8 | 3 | 0 |
| | 7 | 8 | 3 | 1 |
| 2 | 0 | 16 | 0 | 0 |
| | 1 | 16 | 0 | 1 |
| | 2 | 16 | 1 | 0 |
| | 3 | 16 | 1 | 1 |
| | 4 | 16 | 2 | 0 |
| | 5 | 16 | 2 | 1 |
| | 6 | 16 | 3 | 0 |
| | 7 | 16 | 3 | 1 |

The resource configuration index determining module 120 may obtain the corresponding reference signal resource configuration according to the correspondence and according to the determined RI1 and/or PMI1 included in the reference signal resource configuration index.

Further, the CRS or the CSI RS is specified by a specific reference signal resource configuration in the reference signal resource configuration set information. For example, the CRS or the CSI RS is always specified by using the first reference signal resource configuration in the reference signal resource configuration set information.

Type 2: The sounding signal is a synchronization signal, and the reference signal resource configuration index is a resource identifier carried in the synchronization signal or associated with a resource location of the synchronization signal, where the resource identifier carried in the synchronization signal or associated with the resource location of the synchronization signal indicates a reference signal resource configuration in the reference signal resource configuration set information. Optionally, a different resource identifier carried in the synchronization signal is denoted by a different synchronization signal sequence. Specifically, the resource identifier may be denoted by the different synchronization signal sequence. For example, as mentioned above, the synchronization signal sequence is a ZC sequence, and therefore, a different resource identifier may correspond to a different root index value or a different cyclic shift value of the ZC sequence. For example, as mentioned above, the synchronization signal sequence is an m sequence or a Gold sequence or a combination thereof, and therefore, a different resource identifier may correspond to a different m sequence or Gold sequence, or a combination thereof, or a different initial value thereof, or a different cyclic shift value thereof.

The resource configuration index determining module 120 may directly determine, by detecting and determining a synchronization channel whose channel condition is favorable to the resource configuration index determining module 120, the reference signal resource configuration index corresponding to the sounding signal according to the synchronization signal or the resource identifier of the synchronization signal. Implementing time or frequency synchronization by using the structure of the synchronization signal and the corresponding synchronization signal sequence is the prior art, and is not described herein. In addition, selecting a synchronization signal whose channel condition is favorable to the resource configuration index determining module 120 may be implemented based on receive power, and is not limited herein.

Type 3: The sounding signal is a broadcast channel. The reference signal resource configuration index is a resource identifier carried in the broadcast channel or associated with a resource location of the broadcast channel, where the resource identifier carried in the broadcast channel or associated with the resource location of the broadcast channel indicates a reference signal resource configuration in the reference signal resource configuration set information.

Optionally, the resource identifier carried in the broadcast channel may be carried in a broadcast message of a different resource element set, where a broadcast message of a different resource element set carries a different resource identifier. By means of detection and decoding to obtain a corresponding broadcast message, the resource configuration index determining module 120 can obtain the corresponding resource identifier.

Optionally, the resource identifier carried in the broadcast channel is denoted by a different cyclic redundancy check mask. By means of detection and decoding, the user equipment obtains the corresponding broadcast channel, and then performs a hypothesis test on the used CRC mask to obtain the corresponding CRC mask, so as to obtain the corresponding resource identifier. In addition, in the foregoing two implementations, the user equipment obtains, by detecting a broadcast channel whose channel condition is favorable to the user equipment, a resource identifier whose channel condition is favorable to the user equipment.

Receiving the broadcast channel by using the structure of the broadcast channel and the corresponding CRC is the prior art, and is not described herein. In addition, selecting a broadcast channel whose channel condition is favorable to the user equipment may be implemented based on receive power, and is not limited herein.

Optionally, a correspondence between the reference signal resource configuration index and the indicated reference signal resource configuration is predefined or is notified to the user equipment by using higher layer signaling or DCI.

The reference signal set receiving module 130 is configured to receive a reference signal set sent by the base station, where the reference signal set corresponds to the reference signal resource configuration indicated by the reference signal resource configuration index.

Specifically, the reference signal set receiving module 130 may receive only the reference signal set corresponding to the reference signal resource configuration indicated by the reference signal resource configuration index.

The channel state information determining module 140 is configured to determine channel state information according to the reference signal set.

Specifically, the channel state information may include a CQI, a PMI, or an RI. The determining, by the channel state information determining module 140, channel state information CSI according to the reference signal set may include: obtaining, by the channel state information determining module 140, a channel estimation value according to the reference signal set; and determining, by the channel state information determining module 140, the CSI based on a preset criterion and according to the obtained channel estimation value.

Further, a specific implementation manner of determining, by the channel state information determining module 140, channel state information according to the reference signal set may be: determining a second precoding matrix indicator ($PMI_2$) according to the reference signal set, where the $PMI_2$ corresponds to a precoding matrix selected from a second codebook, the second codebook is determined according to the reference signal resource configuration index, and the channel state information includes the $PMI_2$.

Specifically, the second codebook may be determined according to the reference signal resource configuration index. For example, different codebooks may be determined according to a correspondence between a reference signal resource configuration index and a codebook, where the correspondence is shown in Table 3, in which $C_{N,i}$ may be the ith codebook of N antenna ports, where N=4 or 8.

TABLE 3

| Reference signal resource configuration index | Codebook |
| --- | --- |
| 0 | $C_{4,0}$ |
| 1 | $C_{4,1}$ |
| 2 | $C_{4,2}$ |
| 3 | $C_{4,3}$ |
| 4 | $C_{8,0}$ |
| 5 | $C_{8,1}$ |
| 6 | $C_{8,2}$ |
| 7 | $C_{8,3}$ |

Using a 4-antenna codebook as an example, a precoding matrix in C4,0 may be a matrix in a 4-antenna codebook in an LTE system such as an R8 or R11 system, and a precoding matrix in C4,i may be:

$$W_i = \text{diag}\{1, e^{j\theta}, e^{j\varphi}, e^{j(\varphi+\theta)}\} W_0 \quad (22)$$

where matrices $W_0$ and $W_i$ may be a matrix in C4,0 and a matrix in C4,i respectively, and $\theta, \varphi$ are phases. For example, $$\theta = \frac{\pi}{64}, \frac{\pi}{32}, \frac{\pi}{16} \ldots, \varphi = \pi, \frac{\pi}{2}, \frac{\pi}{4}, \ldots.$$

Optionally, in an embodiment, the precoding matrix included in the second codebook is a discrete Fourier transform (DFT) matrix, a Hadamard matrix, a Householder matrix, a kronecker product of two DFT matrices, a product of a DFT matrix and a Hadamard matrix, or a kronecker product of a DFT matrix and a Householder matrix.

In addition, the channel estimation may be implemented according to the prior art, for example, by using the least square method or the minimum mean squared error method. The preset criterion may be a criterion such as capacity maximization or mutual information maximization or throughput maximization, which is not limited in the present disclosure. Selecting a precoding matrix according to a channel estimation by using a preset criterion is the prior art, and is not further described herein.

It should be pointed out that the precoding matrix in the second codebook may be pre-stored on the user equipment side or on the base station side, or may be calculated according to the structure of the precoding matrix, for example, calculated according to a relationship between the second precoding matrix indicator and the precoding matrix, which, however, is not limited in the present disclosure.

The channel state information sending module 150 is configured to send the reference signal resource configuration index and the channel state information to the base station.

Specifically, the channel state information sending module 150 sends the reference signal resource configuration index and reports the channel state information to the base station.

Optionally, the channel state information sending module 150 may send the reference signal resource configuration index and the channel state information to the base station separately on a same subframe or on different subframes.

Further, optionally, a period of sending the reference signal resource configuration index is longer than a period of sending the channel state information. The reference signal resource configuration index is actually used to indicate a CSI measurement reference signal, the sounding signal generally has stronger spatial correlation, time correlation, or frequency correlation than the antenna port corresponding to the signal set, and a channel state changes relatively slowly. Therefore, a time interval or span of sending the reference signal resource configuration index may be longer, so as to further reduce time-frequency resource overheads occupied for sending of the sounding signal and reduce complexity of implementation by the UE.

Referring to FIG. 4, as shown in the figure, the user equipment in this embodiment of the present disclosure may further include a resource configuration set receiving module 160, configured to receive the reference signal resource configuration set information sent by the base station, where the reference signal resource configuration set information includes at least two reference signal resource configurations.

The reference signal resource configuration set information may also be predefined and known by both the user equipment and the base station.

The reference signal resource configuration set information includes at least two reference signal resource configurations. Referring to Table 4, Table 4 is an expression form of the reference signal resource configuration set information. As shown in the table, there are eight different reference signal resource configurations in the table. A reference signal resource configuration may include at least antenna port information and reference signal configuration information, where the reference signal configuration information is used to indicate a resource element used for sending a reference signal on an antenna port, and the antenna port information is a quantity of antenna ports corresponding to one of the reference signal configurations.

TABLE 4

| Reference signal resource configuration index | Reference signal resource configuration set information ||
|---|---|---|
| | Quantity of antenna ports | Reference signal configuration information |
| 0 | 4 | 0 |
| 1 | 4 | 1 |
| 2 | 4 | 2 |
| 3 | 4 | 3 |
| 4 | 8 | 0 |
| 5 | 8 | 1 |
| 6 | 8 | 2 |
| 7 | 8 | 3 |

Optionally, the reference signal resource configuration set information may further include reference signal sequence information. For example, as shown in Table 5, the reference signal resource configuration indexes 0, 1, 2, and 3 support four antenna ports, and use a same reference signal configuration 0. That is, they occupy a same resource element but different reference signal sequences 0, 1, 2, and 3. Antennas corresponding to the different reference signal sequences 0, 1, 2, and 3 may be implemented by using different beams, and the different beams may be orthogonal to each other. On the one hand, using the same resource element can avoid occupying too many time-frequency resources, thereby effectively saving overheads. On the other hand, sending the different reference signal sequences 0, 1, 2, and 3 by the different beams may effectively reduce interference between different reference signals, thereby improving channel estimation precision and ensuring CSI measurement precision.

TABLE 5

| Reference signal resource configuration index | Reference signal resource configuration set information |||
|---|---|---|---|
| | Quantity of antenna ports | Reference signal configuration information | Reference signal sequence information |
| 0 | 4 | 0 | 0 |
| 1 | 4 | 0 | 1 |
| 2 | 4 | 0 | 2 |
| 3 | 4 | 0 | 3 |

Specially, the reference signal resource configuration may have, but not being limited to, the following characteristics:

Characteristic 1: Antenna port sets corresponding to two reference signal resource configurations have at least one same antenna port. Specifically, using the reference signal resource configuration information in Table 4 as an example, reference signal configurations corresponding to the reference signal configuration information may correspond to different antenna port sets. As shown in Table 6, every two adjacent antenna port sets in 4-antenna-port sets have two same antenna ports, and every two adjacent antenna port sets in 8-antenna-port sets have four same antenna ports. On the one hand, the system can support more antenna ports. On the other hand, every two reference signal configurations configured by the user equipment have at least one same antenna port, so as to overcome a coverage gap between antenna ports and overcome an edge effect.

TABLE 6

| Reference signal resource configuration index | Reference signal configuration information ||
|---|---|---|
| | Quantity of antenna ports | Antenna port set |
| 0 | 4 | {0, 1, 2, 3} |
| 1 | 4 | {2, 3, 4, 5} |
| 2 | 4 | {4, 5, 6, 7} |
| 3 | 4 | {6, 7, 0, 1} |
| 4 | 8 | {0, 1, 2, . . . , 7} |
| 5 | 8 | {4, 5, 6, . . . , 11} |
| 6 | 8 | {8, 9, 10, . . . , 15} |
| 7 | 8 | {12, 13, 14, . . . , 19} |

Characteristic 2: The reference signal sequence information is an initial value or cyclic shift value of a reference signal sequence, or different combinations of two base sequences. Specifically, the reference signal sequence information is different initial values or cyclic shift values of the reference signal sequence, or different combinations of two base sequences, as described above.

Characteristic 3: A different antenna port corresponding to each reference signal resource configuration uses a different resource reference signal configuration or a different reference signal sequence, as described above.

Figure 5:
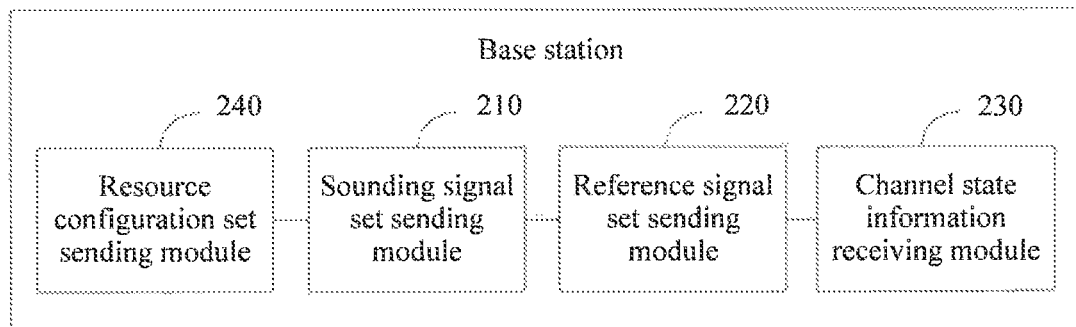
FIG. 5 is a schematic structural diagram of a base station according to an embodiment of the present disclosure.

FIG. 5 is a schematic structural diagram of a base station according to an embodiment of the present disclosure. As shown in the figure, the base station in this embodiment of the present disclosure may include at least a sounding signal set sending module 210, a reference signal set sending module 220, and a channel state information receiving module 230.

The sounding signal set sending module 210 is configured to send a sounding signal set to user equipment, where the sounding signal set includes at least one sounding signal, so that the user equipment determines a reference signal resource configuration index according to the sounding signal set, where the reference signal resource configuration index is used to indicate a reference signal resource configuration in reference signal resource configuration set information.

In a first optional implementation manner, the sounding signal is a cell-specific reference signal (CRS) or a channel state information reference signal (CSI RS). The CRS may support a cell-specific antenna port configuration, and is received by all user equipments in this cell. For example, the CRS may be a reference signal corresponding to an antenna port 0, 1, 2, or 3 in an LTE R8 system. The CSI RS supports signal transmission on a cell-specific antenna port and signal receiving on a user equipment specific antenna port. For example, the CSI RS may be a reference signal corresponding to an antenna port 15, 16, . . . , or 22 in an LTE R10 system. It should be pointed out that the CRS or the CSI RS is not limited to a current LTE system.

In a second optional implementation manner, the sounding signal is a synchronization signal. The synchronization signal is used to implement time and frequency synchronization. One of multiple known or optional synchronization signal sequences is mapped to a resource element set of a synchronization signal. According to the known or optional synchronization signal sequence, the user equipment may implement time and frequency synchronization by detecting the synchronization signal.

Specifically, the synchronization signal may be sent on at least one resource element set separately. For example, using a frame structure in an LTE system as an example, the at least one resource element set may be shown by formulas (1) and (2).

The triplet $(k,l,n_s)$ denotes a location of a resource element used for the synchronization signal, where k, l, and $n_s$ are respectively a subcarrier index, an OFDM symbol index, and a timeslot index of the resource element; $N_{SS}$ denotes a length of a synchronization signal sequence.

Specifically, in each resource element set, the synchronization signal sends a synchronization signal sequence. The synchronization signal sequence may be a Zadoff-Chu (ZC) sequence. Using $N_{SS}=62$ as an example, the synchronization signal sequence is a ZC sequence shown by formula (3) or a cyclic shift of the ZC sequence shown by formula (4), where the parameter u is a root index of the ZC sequence, and its value may be, for example, 25, 29, or 34; the parameter v is a cyclic shift value, and its value may be, for example, a positive integer such as 3 or 6.

Optionally, the synchronization signal sequence may also be an m sequence or a Gold sequence or a combination thereof, and is not further enumerated herein.

Specifically, the synchronization signal sequence may be separately mapped to different resource element sets. Using the ZC sequence whose length is 62 as an example, 62 elements in the sequence may be mapped to 62 resource element locations respectively. For example, a sequence element in an RE location $(k,l,n_s)$ in the resource element set $S_i^{SS}$ is formula (5) or (6), where $u_i$ and $v_i$ are respectively a root index value and a cyclic shift value of a ZC sequence used for the synchronization signal on the resource element set $S_i^{SS}$. A synchronization signal on a different resource element set $S_j^{SS}$ may use a different root index value or a different cyclic shift value or a combination thereof. It should be pointed out that a different $u_i$ or $v_i$ or a combination $(u_i,v_i)$ thereof may correspond to a different piece of information, so that the synchronization signal sent on the different resource element sets carries different information.

In a third optional implementation manner, the sounding signal is a broadcast channel. The broadcast channel is used to send a broadcast message. The broadcast message may include, for example, a system bandwidth, a system frame number, physical channel configuration indication information, or a combination thereof.

Specifically, the broadcast channel may be sent on at least one resource element set separately. For example, using a frame structure in an LTE system as an example, the at least one resource element set may be shown by formulas (7) and (8) or formulas (9) and (10), where the quadruplet $(k,l,n_s, n_f)$ denotes a location of a resource element used for the broadcast channel, where k, l, $n_s$, and $n_f$ are respectively a subcarrier index, an OFDM symbol index, a timeslot index, and a system frame number of the resource element; $j_0 \neq j_1$, and value ranges of all parameters j, $j_0$, and $j_1$ are 0, 1, . . . , 4N−1. The positive integer N in formulas (7) to (10) may be 1 or a positive integer greater than 1.

Specifically, a broadcast channel sent by each resource element group may be mapped to a corresponding resource element set after undergoing channel coding (by using a convolutional code or a Turbo code) and modulation. In addition, before channel coding, a cyclic redundancy check (CRC) code may be appended to the broadcast message.

Optionally, the broadcast channels in the different resource element sets may further carry additional information separately in addition to the system broadcast information. Optionally, an implementation manner may be:

Manner 1: The additional information and the broadcast information form a broadcast message, and undergo processing such as channel coding.

Manner 2: The additional information is denoted by a different CRC mask. Specifically, a CRC check bit corresponding to the broadcast message carried in the broadcast channel is $p_n$, n=0, 1, 2, . . . , $N_{CRC}-1$, and a CRC mask corresponding to the indication information is $x_n$, n=0, 1, 2, . . . , $N_{CRC}-1$. Therefore, after CRC mask scrambling, bit sequences shown by formulas (11) to (15) are generated.

It should be specially noted that the foregoing three implementation manners merely show three specific sounding signal types proposed in this embodiment of the present disclosure. However, type of the sounding signal is not limited thereto, and is not enumerated exhaustively herein.

The user equipment determines the reference signal resource configuration index according to the sounding signal set in the following specific implementation manners:

Type 1: The sounding signal is a CRS or a channel state information reference signal CSI RS, and the reference signal resource configuration index includes a $RI_1$ and/or a $PMI_1$. Specifically, the determining, by the user equipment, the $RI_1$ and/or the $PMI_1$ according to the CRS or the CSI RS includes: obtaining, by the user equipment, a channel estimation value according to the CRS or the CSI RS; and obtaining, by the user equipment, the channel estimation value, and selecting a first precoding matrix from a first codebook according to a preset criterion, where the first precoding matrix corresponds to the $RI_1$ and/or the $PMI_1$.

The channel estimation may be implemented according to the prior art, for example, by using the least square method or the minimum mean squared error method.

The preset criterion may be a criterion such as capacity maximization or mutual information maximization or throughput maximization, which is not limited in the present disclosure.

The first codebook is a precoding matrix set, in which each first precoding matrix is referred to as a codeword, and each codeword may be indicated by the $RI_1$ and/or the $PMI_1$.

Optionally, in an embodiment, the user equipment determines that a precoding matrix included in the first codebook used by the first precoding matrix is a precoding matrix in a 2-antenna codebook, a 4-antenna codebook, or an 8-antenna codebook in the LTE R10 system, or is a precoding matrix in a 2-antenna codebook, a 4-antenna codebook, or an 8-antenna codebook in an LTE R12 system.

In this embodiment of the present disclosure, optionally, as an embodiment, a precoding matrix included in the first codebook is a discrete Fourier transform (DFT) matrix, a Hadamard matrix, a Householder matrix, a kronecker product of two DFT matrices, a kronecker product of a DFT matrix and a Hadamard matrix, or a kronecker product of a DFT matrix and a Householder matrix.

It should be pointed out that the precoding matrix in the first codebook may be pre-stored on a user equipment side or on a base station side, or may be calculated according to a structure of the precoding matrix, for example, calculated according to a relationship between the first precoding matrix indicator and the precoding matrix, which, however, is not limited in the present disclosure.

Selecting a precoding matrix according to a channel estimation by using a preset criterion is the prior art, and is not further described herein.

A correspondence between the $RI_1$ and/or the $PMI_1$ included in the reference signal resource configuration index and the reference signal resource configuration information may be predefined or may be notified by the base station to the user equipment by using higher layer signaling such as RRC signaling or DCI, which is specifically shown in Table 1 or Table 2.

The user equipment may obtain the corresponding reference signal resource configuration according to the correspondence and according to the determined $RI_1$ and/or $PMI_1$ included in the reference signal resource configuration index.

Further, the CRS or the CSI RS is specified by a specific reference signal resource configuration in the reference signal resource configuration set information. For example, the CRS or the CSI RS is always specified by using the first reference signal resource configuration in the reference signal resource configuration set information.

Type 2: The sounding signal is a synchronization signal, and the reference signal resource configuration index is a resource identifier carried in the synchronization signal or associated with a resource location of the synchronization signal, where the resource identifier carried in the synchronization signal or associated with the resource location of the synchronization signal indicates a reference signal resource configuration in the reference signal resource configuration set information. Optionally, a different resource identifier carried in the synchronization signal is denoted by a different synchronization signal sequence. Specifically, the resource identifier may be denoted by the different synchronization signal sequence. For example, as mentioned above, the synchronization signal sequence is a ZC sequence, and therefore, a different resource identifier may correspond to a different root index value or a different cyclic shift value of the ZC sequence. For example, as mentioned above, the synchronization signal sequence is an m sequence or a Gold sequence or a combination thereof, and therefore, a different resource identifier may correspond to a different m sequence or Gold sequence, or a combination thereof, or a different initial value thereof, or a different cyclic shift value thereof.

The user equipment may directly determine, by detecting and determining a synchronization channel whose channel condition is favorable to the user equipment, the reference signal resource configuration index corresponding to the sounding signal according to the synchronization signal or the resource identifier of the synchronization signal. Implementing time or frequency synchronization by using the structure of the synchronization signal and the corresponding synchronization signal sequence is the prior art, and is not described herein. In addition, selecting a synchronization signal whose channel condition is favorable to the user equipment may be implemented based on receive power, and is not limited herein.

Type 3: The sounding signal is a broadcast channel. The reference signal resource configuration index is a resource identifier carried in the broadcast channel or associated with a resource location of the broadcast channel, where the resource identifier carried in the broadcast channel or associated with the resource location of the broadcast channel indicates a reference signal resource configuration in the reference signal resource configuration set information.

Optionally, the resource identifier carried in the broadcast channel may be carried in a broadcast message of a different resource element set, where a broadcast message of a different resource element set carries a different resource identifier. By means of detection and decoding to obtain a corresponding broadcast message, the user equipment can obtain the corresponding resource identifier.

Optionally, the resource identifier carried in the broadcast channel is denoted by a different cyclic redundancy check mask. By means of detection and decoding, the user equipment obtains the corresponding broadcast channel, and then performs a hypothesis test on the used CRC mask to obtain the corresponding CRC mask, so as to obtain the corresponding resource identifier. In addition, in the foregoing two implementations, the user equipment obtains, by detecting a broadcast channel whose channel condition is favorable to the user equipment, a resource identifier whose channel condition is favorable to the user equipment.

Receiving the broadcast channel by using the structure of the broadcast channel and the corresponding CRC is the prior art, and is not described herein. In addition, selecting a broadcast channel whose channel condition is favorable to the user equipment may be implemented based on receive power, and is not limited herein.

Optionally, a correspondence between the reference signal resource configuration index and the indicated reference signal resource configuration is predefined or is notified to the user equipment by using higher layer signaling or DCI.

The reference signal set sending module 220 is configured to send at least two reference signal sets to the user equipment, where the at least two reference signal sets correspond to at least two reference signal resource configurations included in the reference signal resource configuration set information, so that the user equipment determines a channel state according to the reference signal set.

The channel state information may include a CQI, a PMI, or an RI. The determining, by the user equipment, channel state information CSI according to the reference signal set may include: obtaining, by the user equipment, a channel estimation value according to the reference signal set.

Further, a specific implementation manner of determining, by the user equipment, channel state information according to the reference signal set may be: determining a $PMI_2$ according to the reference signal set, where the $PMI_2$ corresponds to a precoding matrix selected from a second codebook, the second codebook is determined according to the reference signal resource configuration index, and the channel state information includes the $PMI_2$.

Specifically, the second codebook may be determined according to the reference signal resource configuration index. For example, different codebooks may be determined according to a correspondence between a reference signal resource configuration index and a codebook, where the correspondence is shown in Table 3, in which $C_{N,i}$ may be the $i^{th}$ codebook of N antenna ports, where N=4 or 8.

Using a 4-antenna codebook as an example, a precoding matrix in $C_{4,0}$ may be a matrix in a 4-antenna codebook in an LTE system such as an R8 or R11 system, and a precoding matrix in $C_{4,i}$ may be shown by formula (22), where matrices $W_0$ and $W_i$ may be a matrix in $C_{4,0}$ and a matrix in $C_{4,i}$ respectively, and $\theta, \varphi$ are phases. For example, $$\theta = \frac{\pi}{64}, \frac{\pi}{32}, \frac{\pi}{16} \ldots, \varphi = \pi, \frac{\pi}{2}, \frac{\pi}{4}, \ldots.$$

Optionally, in an embodiment, the precoding matrix included in the second codebook is a discrete Fourier transform DFT matrix, a Hadamard matrix, a Householder matrix, a kronecker product of two DFT matrices, a kronecker product of a DFT matrix and a Hadamard matrix, or a kronecker product of a DFT matrix and a Householder matrix.

In addition, the channel estimation may be implemented according to the prior art, for example, by using the least square method or the minimum mean squared error method. The preset criterion may be a criterion such as capacity maximization or mutual information maximization or throughput maximization, which is not limited in the present disclosure. Selecting a precoding matrix according to a channel estimation by using a preset criterion is the prior art, and is not further described herein.

It should be pointed out that the precoding matrix in the second codebook may be pre-stored on the user equipment side or on the base station side, or may be calculated according to the structure of the precoding matrix, for example, calculated according to a relationship between the second precoding matrix indicator and the precoding matrix, which, however, is not limited in the present disclosure.

The channel state information receiving module 230 is configured to receive the reference signal resource configuration index and the channel state information that are sent by the user equipment.

Optionally, the channel state information receiving module 230 may receive the reference signal resource configuration index and the channel state information that are sent by the user equipment on a same subframe or on different subframes separately.

Further, optionally, a period of sending the reference signal resource configuration index is longer than a period of sending the channel state information. The reference signal resource configuration index is actually used to indicate a CSI measurement reference signal, the sounding signal generally has stronger spatial correlation, time correlation, or frequency correlation than the antenna port corresponding to the signal set, and a channel state changes relatively slowly. Therefore, a time interval or span of sending the reference signal resource configuration index may be longer, so as to further reduce time-frequency resource overheads occupied for sending of the sounding signal and reduce complexity of implementation by the UE.

Referring to FIG. 5, as shown in the figure, the base station in this embodiment of the present disclosure may further include a resource configuration set sending module 240, configured to send the reference signal resource configuration set information to the user equipment, where the reference signal resource configuration set information includes the at least two reference signal resource configurations.

Specifically, the resource configuration set sending module 240 may notify the user equipment of the reference signal resource configuration set information by using higher layer signaling such as RRC signaling or DCI, and the reference signal resource configuration set information may also be predefined and known by both the user equipment and the base station.

The reference signal resource configuration set information includes at least two reference signal resource configurations. Referring to Table 4, Table 4 is an expression form of the reference signal resource configuration set information. As shown in the table, there are eight different reference signal resource configurations in the table. A reference signal resource configuration may include at least antenna port information and reference signal configuration information, where the reference signal configuration information is used to indicate a resource element used for sending a reference signal on an antenna port, and the antenna port information is a quantity of antenna ports corresponding to one of the reference signal configurations.

Optionally, the reference signal resource configuration set information may further include reference signal sequence information. For example, as shown in Table 5, the reference signal resource configuration indexes 0, 1, 2, and 3 support four antenna ports, and use a same reference signal configuration 0. That is, they occupy a same resource element but different reference signal sequences 0, 1, 2, and 3. Antennas corresponding to the different reference signal sequences 0, 1, 2, and 3 may be implemented by using different beams, and the different beams may be orthogonal to each other. On the one hand, using the same resource element can avoid occupying too many time-frequency resources, thereby effectively saving overheads. On the other hand, sending the different reference signal sequences 0, 1, 2, and 3 by the different beams may effectively reduce interference between different reference signals, thereby improving channel estimation precision and ensuring CSI measurement precision.

Specially, the reference signal resource configuration may have, but not being limited to, the following characteristics.

Characteristic 1: Antenna port sets corresponding to two reference signal resource configurations have at least one same antenna port. Specifically, using the reference signal resource configuration information in Table 4 as an example, reference signal configurations corresponding to the reference signal configuration information may correspond to different antenna port sets. As shown in Table 6, every two adjacent antenna port sets in 4-antenna-port sets have two same antenna ports, and every two adjacent antenna port sets in 8-antenna-port sets have four same antenna ports. On the one hand, the system can support more antenna ports. On the other hand, every two reference signal configurations configured by the user equipment have at least one same antenna port, so as to overcome a coverage gap between antenna ports and overcome an edge effect.

Characteristic 2: The reference signal sequence information is an initial value or cyclic shift value of a reference signal sequence, or different combinations of two base sequences. Specifically, the reference signal sequence information is different initial values or cyclic shift values of the reference signal sequence, or different combinations of two base sequences, as described above.

Characteristic 3: A different antenna port corresponding to each reference signal resource configuration uses a different resource reference signal configuration or a different reference signal sequence, as described above.

Figure 6:
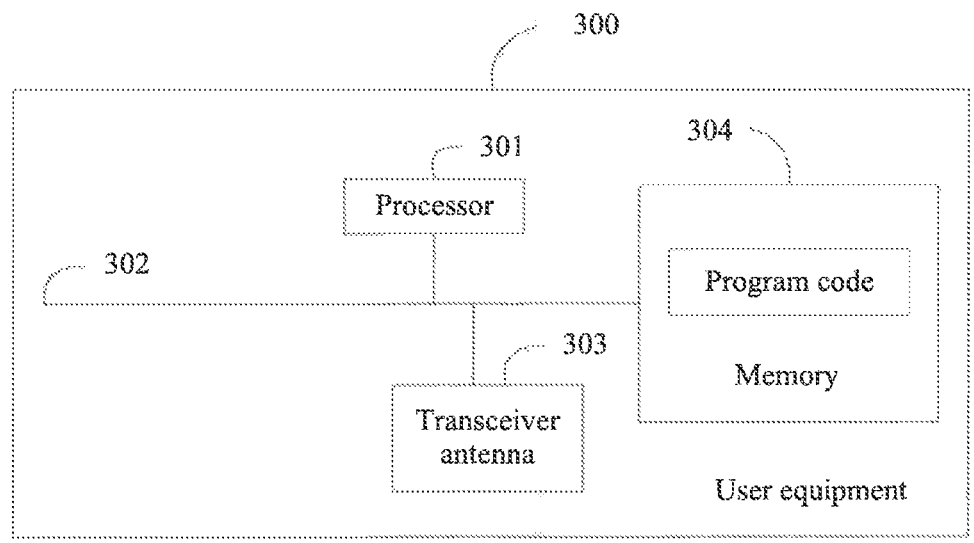
FIG. 6 is a schematic structural diagram of another user equipment according to an embodiment of the present disclosure.

FIG. 6 is a schematic structural diagram of user equipment according to another embodiment of the present disclosure. As shown in FIG. 6, the user equipment may include at least one processor 301, for example, a CPU, at least one transceiver antenna 303, a memory 304, and at least one communications bus 302. The communications bus 302 is configured to implement connection and communication between these components. The transceiver antenna 303 may be configured to perform signaling or data communication with another node device. The memory 304 may be a high-speed RAM memory, or may be a non-volatile memory (non-volatile memory), for example, at least one magnetic disk memory. Optionally, the memory 304 may be at least one storage apparatus located far away from the processor 301. The memory 304 stores a set of program code, and the processor is configured to invoke the program code stored in the memory to perform the following operations: receiving a sounding signal set sent by the base station, where the sounding signal set includes at least one sounding signal; determining a reference signal resource configuration index according to the sounding signal set, where the reference signal resource configuration index is used to indicate a reference signal resource configuration in reference signal resource configuration set information; receiving a reference signal set sent by the base station, where the reference signal set corresponds to the reference signal resource configuration indicated by the reference signal resource configuration index; determining channel state information according to the reference signal set; and sending the reference signal resource configuration index and the channel state information to the base station.

Optionally, before the determining, by the processor 301, a reference signal resource configuration index according to the sounding signal set, the following operation is further included: receiving the reference signal resource configuration set information sent by the base station, where the reference signal resource configuration set information includes at least two reference signal resource configurations.

Optionally, the determining, by the processor 301, channel state information according to the reference signal set is specifically: determining a $PMI_2$ according to the reference signal set, where the $PMI_2$ corresponds to a precoding matrix selected from a codebook, and the codebook is determined according to the reference signal resource configuration index; and the channel state information includes the $PMI_2$.

Figure 7:
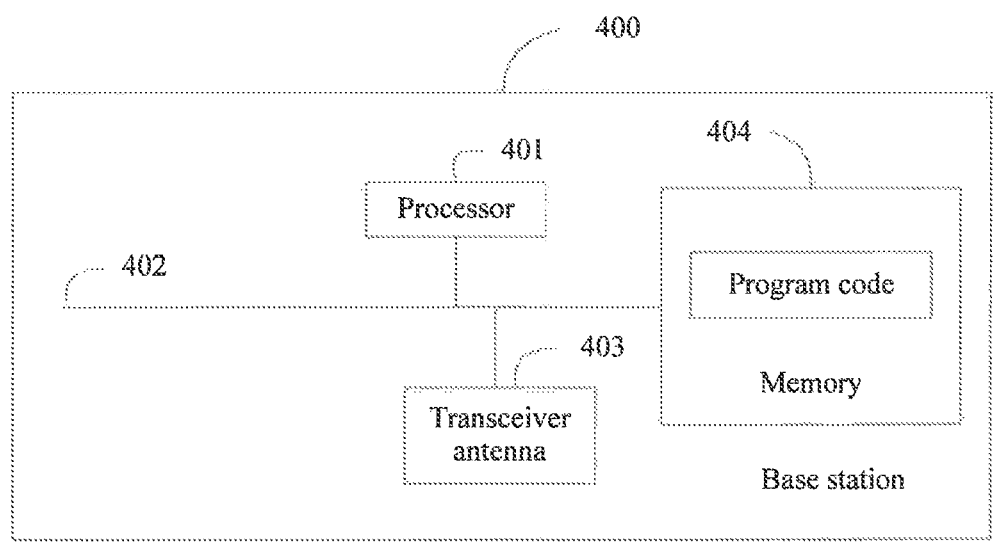
FIG. 7 is a schematic structural diagram of another base station according to an embodiment of the present disclosure.

FIG. 7 is a schematic structural diagram of a base station according to another embodiment of the present disclosure. As shown in FIG. 7, the base station may include at least one processor 401, for example, a CPU, multiple transceiver antennas 403, a memory 404, and at least one communications bus 402. The communications bus 402 is configured to implement connection and communication between these components. The transceiving antenna 403 may be configured to perform signaling or data communication with another node device. The memory 404 may be a high-speed RAM memory, or may be a non-volatile memory, for example, at least one magnetic disk memory. Optionally, the memory 404 may be at least one storage apparatus located far away from the processor 401. The memory 404 stores a set of program code, and the processor is configured to invoke the program code stored in the memory to perform the following operations: sending a sounding signal set to user equipment, where the sounding signal set includes at least one sounding signal, so that the user equipment determines a reference signal resource configuration index according to the sounding signal set, where the reference signal resource configuration index is used to indicate a reference signal resource configuration in reference signal resource configuration set information; sending at least two reference signal sets to the user equipment, where the at least two reference signal sets correspond to at least two reference signal resource configurations included in the reference signal resource configuration set information; and receiving the reference signal resource configuration index and channel state information that are sent by the user equipment, where the channel state information is obtained by the user equipment according to a reference signal resource configuration indicated by the reference signal resource configuration index.

Optionally, the processor 401 further includes: sending the reference signal resource configuration set information to the user equipment, where the reference signal resource configuration set information includes the at least two reference signal resource configurations.

Figure 8:
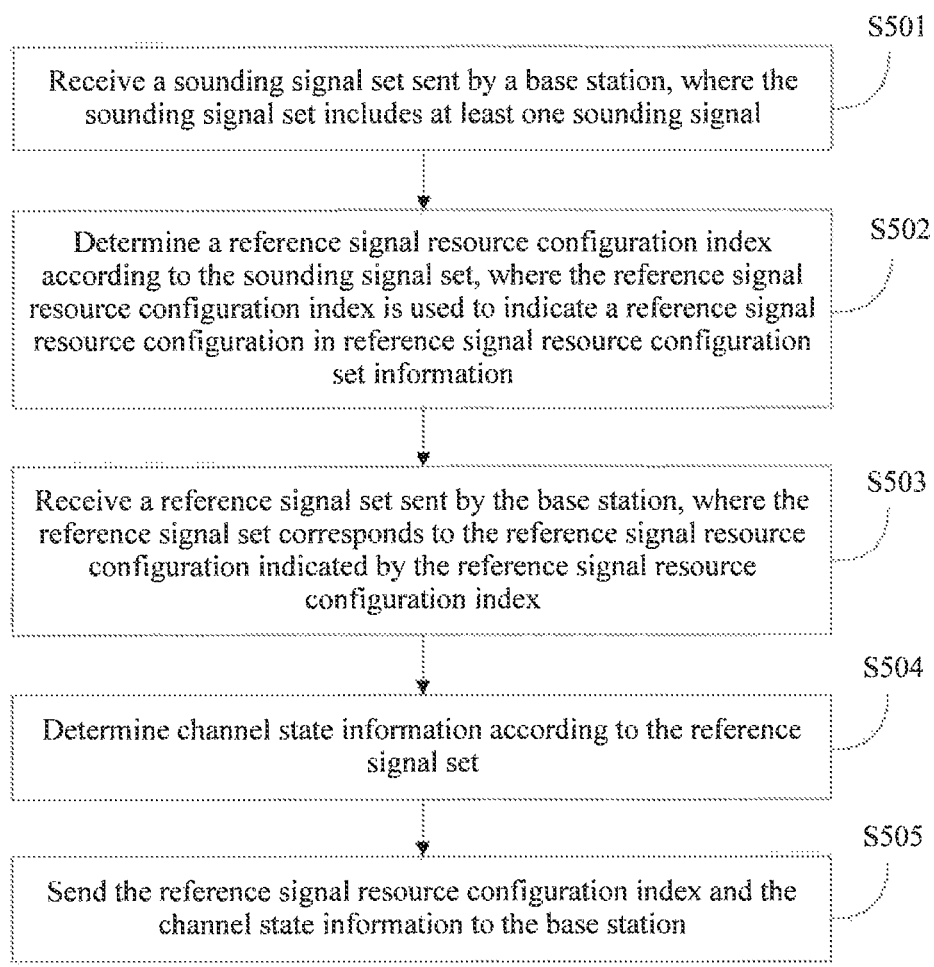
FIG. 8 is a schematic flowchart of a method for reporting channel state information according to an embodiment of the present disclosure.

FIG. 8 is a schematic flowchart of a method for reporting channel state information according to an embodiment of the present disclosure. As shown in the figure, a procedure of the method for reporting channel state information in this embodiment may include.

S501. User equipment receives a sounding signal set sent by a base station.

Specifically, the sounding signal set includes at least one sounding signal. It should be pointed out that.

In a first optional implementation manner, the sounding signal is a cell-specific reference signal (CRS) or a channel state information reference signal (CSI RS). The CRS may support a cell-specific antenna port configuration, and is received by all user equipments in this cell. For example, the CRS may be a reference signal corresponding to an antenna port 0, 1, 2, or 3 in an LTE R8 system. The CSI RS supports signal transmission on a cell-specific antenna port and signal receiving on a user equipment specific antenna port. For example, the CSI RS may be a reference signal corresponding to an antenna port 15, 16, . . . , or 22 in an LTE R10 system. It should be pointed out that the CRS or the CSI RS is not limited to a current LTE system.

In a second optional implementation manner, the sounding signal is a synchronization signal. The synchronization signal is used to implement time and frequency synchronization. one of multiple known or optional synchronization signal sequences is mapped to a resource element set of a synchronization signal. According to the known or optional synchronization signal sequence, the user equipment may implement time and frequency synchronization by detecting the synchronization signal.

Specifically, the synchronization signal may be sent on at least one resource element set separately. For example, using a frame structure in an LTE system as an example, the at least one resource element set may be shown by formula (1)

or (2). The triplet $(k,l,n_s)$ denotes a location of a resource element used for the synchronization signal, where k, l, and $n_s$ are respectively a subcarrier index, an OFDM symbol index, and a timeslot index of the resource element; $N_{SS}$ denotes a length of a synchronization signal sequence.

Specifically, in each resource element set, the synchronization signal sends a synchronization signal sequence. The synchronization signal sequence may be a Zadoff-Chu (ZC) sequence. Using $N_{SS}=62$ as an example, the synchronization signal sequence is a ZC sequence shown by formula (3), or a cyclically shifted ZC sequence shown by formula (4). The parameter u is a root index of the ZC sequence, and its value may be, for example, 25, 29, or 34; the parameter v is a cyclic shift value, and its value may be, for example, a positive integer such as 3 or 6.

Optionally, the synchronization signal sequence may also be an m sequence or a Gold sequence or a combination thereof, and is not further enumerated herein.

Specifically, the synchronization signal sequence may be separately mapped to different resource element sets. Using the ZC sequence whose length is 62 as an example, 62 elements in the sequence may be mapped to 62 resource element locations respectively. For example, a sequence element in an RE location $(k,l,n_s)$ in the resource element set $S_i^{SS}$ is shown by formula (5) or formula (6), where $u_i$ and $v_i$ are respectively a root index value and a cyclic shift value of a ZC sequence used for the synchronization signal on the resource element set $S_i^{SS}$. A synchronization signal on a different resource element set $S_i^{SS}$ may use a different root index value or a different cyclic shift value or a combination thereof. It should be pointed out that a different $u_i$ or $v_i$ or a combination $(u_i,v_i)$ thereof may correspond to a different piece of information, so that the synchronization signal sent on the different resource element sets carries different information.

In a third optional implementation manner, the sounding signal is a broadcast channel. The broadcast channel is used to send a broadcast message. The broadcast message may include, for example, a system bandwidth, a system frame number, physical channel configuration indication information, or a combination thereof.

Specifically, the broadcast channel may be sent on at least one resource element set separately. For example, using a frame structure in an LTE system as an example, the at least one resource element set may be shown by formulas (7) and (8) or formulas (9) and (10). The quadruplet $(k,l,n_s,n_f)$ denotes a location of a resource element used for the broadcast channel, where k, l, $n_s$, and $n_f$ are respectively a subcarrier index, an OFDM symbol index, a timeslot index, and a system frame number of the resource element; $j_0 \neq j_1$, and value ranges of all parameters j, $j_0$, and $j_1$ are 0 to 4N−1. The positive integer N in formulas (7) to (10) may be 1 or a positive integer greater than 1.

Specifically, a broadcast channel sent by each resource element group may be mapped to a corresponding resource element set after undergoing channel coding (by using a convolutional code or a Turbo code) and modulation. In addition, before channel coding, a cyclic redundancy check (CRC) code may be appended to the broadcast message.

Optionally, the broadcast channels in the different resource element sets may further carry additional information separately in addition to the system broadcast information. Optionally, an implementation manner may be.

Manner 1: The additional information and the broadcast information form a broadcast message, and undergo processing such as channel coding.

Manner 2: The additional information is denoted by a different CRC mask (Mask). Specifically, a CRC check bit corresponding to the broadcast message carried in the broadcast channel is $p_n$, n=0, 1, 2, ..., $N_{CRC}-1$, and a CRC mask corresponding to the indication information is $x_n$, n=0, 1, 2, ..., $N_{CRC}-1$. Therefore, after CRC mask scrambling, a bit sequence shown by formula (11) is generated.

For example, when $N_{CRC}=16$ or 24, four different CRC masks may be shown by formulas (12) to (15) respectively.

It should be specially noted that the foregoing three implementation manners merely show three specific sounding signal types proposed in this embodiment of the present disclosure. However, type of the sounding signal is not limited thereto, and is not enumerated exhaustively herein.

S502. The user equipment determines a reference signal resource configuration index according to the sounding signal set.

It should be pointed out that the reference signal resource configuration index is used to indicate a reference signal resource configuration in reference signal resource configuration set information. Generally, each reference signal corresponds to one antenna port. By means of a least square method, a minimum mean squared error method, or the like, a channel estimation on a corresponding antenna port may be obtained according to a resource element location occupied by each reference signal in a resource grid of the corresponding antenna port.

Specifically, the reference signal resource configuration may include information such as a supported quantity of antenna ports, a reference signal sending period and an offset in the sending period, an RE location occupied by a reference signal, or a reference signal sequence. The RE location occupied by the reference signal or a time-frequency pattern of the reference signal is generally referred to as a reference signal configuration. Using 8 antenna ports as an example, RE locations corresponding to the 8 antenna ports in frame structures FS1 and FS are shown in FIG. 2a and FIG. 2b respectively. Using 16 antenna ports as an example, RE locations corresponding to the 16 antenna ports in the frame structures FS1 and FS are shown in FIG. 3a and FIG. 3b respectively. Using FIG. 3a as an example, RE locations denoted by digits 0, 1, ..., 7 in the figure are locations occupied by reference signals.

Specifically, the reference signal sends a reference signal sequence on an occupied resource element set. Optionally, the reference signal sequence may be a ZC sequence or an m sequence, or may be obtained according to a combination of two base sequences or according to a pseudo random sequence, or the like.

For example, the reference signal sequence may be generated according to a pseudo random sequence, for example, as shown in formulas (16) to (19), where $n_s$ is a timeslot number in a radio frame, and l is an OFDM symbol number in a timeslot. An initial value of the pseudo random sequence c(i) may be set according to specific implementation.

Optionally, the reference signal sequence may be obtained by means of cyclic shift according to a root sequence, for example, obtained according to formula (20). The base sequence is generated according to $r_u(n)=x_u(n \bmod N_{ZC}^{RS})$, where $x_u(n)$ is a root sequence of a root index value u, $N_{RS}$ is a length of the reference signal sequence, and v is a CS value.

Optionally, the reference signal sequence may be obtained according to a combination of two base sequences, for example, obtained according to formula (21), where $r(m)=e^{j\alpha m}$ and $\alpha=2\pi n_{cs}/M$, $0 \leq n_{cs} < M$.

Optionally, the reference signal resource configuration set information may be sent by the base station to the user equipment when or before step S501 is performed. Specifically, the base station may notify the user equipment of the reference signal resource configuration set information by using higher layer signaling such as RRC signaling or DCI.

The reference signal resource configuration set information may also be predefined and known by both the user equipment and the base station.

The reference signal resource configuration set information includes at least two reference signal resource configurations. Referring to Table 4, Table 4 is an expression form of the reference signal resource configuration set information. As shown in the table, there are eight different reference signal resource configurations in the table. A reference signal resource configuration may include at least antenna port information and reference signal configuration information, where the reference signal configuration information is used to indicate a resource element used for sending a reference signal on an antenna port, and the antenna port information is a quantity of antenna ports corresponding to one of the reference signal configurations.

Optionally, the reference signal resource configuration set information may further include reference signal sequence information. For example, as shown in Table 5, the reference signal resource configuration indexes 0, 1, 2, and 3 support four antenna ports, and use a same reference signal configuration 0. That is, they occupy a same resource element but different reference signal sequences 0, 1, 2, and 3. Antennas corresponding to the different reference signal sequences 0, 1, 2, and 3 may be implemented by using different beams, and the different beams may be orthogonal to each other. On the one hand, using the same resource element can avoid occupying too many time-frequency resources, thereby effectively saving overheads. On the other hand, sending the different reference signal sequences 0, 1, 2, and 3 by the different beams may effectively reduce interference between different reference signals, thereby improving channel estimation precision and ensuring CSI measurement precision.

Specially, the reference signal resource configuration may have, but not being limited to, the following characteristics.

Characteristic 1: Antenna port sets corresponding to two reference signal resource configurations have at least one same antenna port. Specifically, using the reference signal resource configuration information in Table 4 as an example, reference signal configurations corresponding to the reference signal configuration information may correspond to different antenna port sets. As shown in Table 6, every two adjacent antenna port sets in 4-antenna-port sets have two same antenna ports, and every two adjacent antenna port sets in 8-antenna-port sets have four same antenna ports. On the one hand, the system can support more antenna ports. On the other hand, every two reference signal configurations configured by the user equipment have at least one same antenna port, so as to overcome a coverage gap between antenna ports and overcome an edge effect.

Characteristic 2. The reference signal sequence information is an initial value or cyclic shift value of a reference signal sequence, or different combinations of two base sequences. Specifically, the reference signal sequence information is different initial values or cyclic shift values of the reference signal sequence, or different combinations of two base sequences, as described above.

Characteristic 3. A different antenna port corresponding to each reference signal resource configuration uses a different resource reference signal configuration or a different reference signal sequence, as described above.

Specifically, for a different sounding signal type in step S501, the user equipment determines the reference signal resource configuration index according to the sounding signal set in the following specific implementation manners.

Type 1: The sounding signal is a cell-specific reference signal (CRS) or a channel state information reference signal (CSI RS), and the reference signal resource configuration index includes an $RI_1$ and/or a $PMI_1$. Specifically, the determining, by the user equipment, the $RI_1$ and/or the PMI1 according to the CRS or the CSI RS includes: obtaining, by the user equipment, a channel estimation value according to the CRS or the CSI RS; and obtaining, by the user equipment, the channel estimation value, and selecting a first precoding matrix from a first codebook according to a preset criterion, where the first precoding matrix corresponds to the RI1 and/or the PMI1.

The channel estimation may be implemented according to the prior art, for example, by using the least square (LS) method or the minimum mean squared error (MMSE) method.

The preset criterion may be a criterion such as capacity maximization or mutual information maximization or throughput maximization, which is not limited in the present disclosure.

The first codebook is a precoding matrix set, in which each first precoding matrix is referred to as a codeword, and each codeword may be indicated by the $RI_1$ and/or the $PMI_1$.

Optionally, in an embodiment, the user equipment determines that a precoding matrix included in the first codebook used by the first precoding matrix is a precoding matrix in a 2-antenna codebook, a 4-antenna codebook, or an 8-antenna codebook in the LTE R10 system, or is a precoding matrix in a 2-antenna codebook, a 4-antenna codebook, or an 8-antenna codebook in an LTE R12 system.

In this embodiment of the present disclosure, optionally, as an embodiment, a precoding matrix included in the first codebook is a discrete Fourier transform (DFT) matrix, a Hadamard matrix, a Householder matrix, a kronecker product of two DFT matrices, a kronecker product of a DFT matrix and a Hadamard matrix, or a kronecker product of a DFT matrix and a Householder matrix.

It should be pointed out that the precoding matrix in the first codebook may be pre-stored on a user equipment side or on a base station side, or may be calculated according to a structure of the precoding matrix, for example, calculated according to a relationship between the first precoding matrix indicator and the precoding matrix, which, however, is not limited in the present disclosure.

Selecting a precoding matrix according to a channel estimation by using a preset criterion is the prior art, and is not further described herein.

A correspondence between the $RI_1$ and/or the $PMI_1$ included in the reference signal resource configuration index and the reference signal resource configuration information may be predefined or may be notified by the base station to the user equipment by using higher layer signaling such as RRC signaling or DCI, which is specifically shown in Table 1 or Table 2.

The user equipment may obtain the corresponding reference signal resource configuration according to the correspondence and according to the determined $RI_1$ and/or $PMI_1$ included in the reference signal resource configuration index.

Further, the cell-specific reference signal (CRS) or the channel state information reference signal (CSI RS) is specified by a specific reference signal resource configuration in the reference signal resource configuration set information. For example, the CRS or the CSI RS is always specified by using the first reference signal resource configuration in the reference signal resource configuration set information.

Type 2: The sounding signal is a synchronization signal, and the reference signal resource configuration index is a resource identifier carried in the synchronization signal or associated with a resource location of the synchronization signal, where the resource identifier carried in the synchronization signal or associated with the resource location of the synchronization signal indicates a reference signal resource configuration in the reference signal resource configuration set information. Optionally, a different resource identifier carried in the synchronization signal is denoted by a different synchronization signal sequence. Specifically, the resource identifier may be denoted by the different synchronization signal sequence. For example, as mentioned above, the synchronization signal sequence is a ZC sequence, and therefore, a different resource identifier may correspond to a different root index value or a different cyclic shift value of the ZC sequence. For example, as mentioned above, the synchronization signal sequence is an m sequence or a Gold sequence or a combination thereof, and therefore, a different resource identifier may correspond to a different m sequence or Gold sequence, or a combination thereof, or a different initial value thereof, or a different cyclic shift value thereof.

The user equipment may directly determine, by detecting and determining a synchronization channel whose channel condition is favorable to the user equipment, the reference signal resource configuration index corresponding to the sounding signal according to the synchronization signal or the resource identifier of the synchronization signal. Implementing time or frequency synchronization by using the structure of the synchronization signal and the corresponding synchronization signal sequence is the prior art, and is not described herein. In addition, selecting a synchronization signal whose channel condition is favorable to the user equipment may be implemented based on receive power, and is not limited herein.

Type 3: The sounding signal is a broadcast channel. The reference signal resource configuration index is a resource identifier carried in the broadcast channel or associated with a resource location of the broadcast channel, where the resource identifier carried in the broadcast channel or associated with the resource location of the broadcast channel indicates a reference signal resource configuration in the reference signal resource configuration set information.

Optionally, the resource identifier carried in the broadcast channel may be carried in a broadcast message of a different resource element set, where a broadcast message of a different resource element set carries a different resource identifier. By means of detection and decoding to obtain a corresponding broadcast message, the user equipment can obtain the corresponding resource identifier.

Optionally, the resource identifier carried in the broadcast channel is denoted by a different cyclic redundancy check mask. By means of detection and decoding, the user equipment obtains the corresponding broadcast channel, and then performs a hypothesis test on the used CRC mask to obtain the corresponding CRC mask, so as to obtain the corresponding resource identifier. In addition, in the foregoing two implementations, the user equipment obtains, by detecting a broadcast channel whose channel condition is favorable to the user equipment, a resource identifier whose channel condition is favorable to the user equipment.

Receiving the broadcast channel by using the structure of the broadcast channel and the corresponding CRC is the prior art, and is not described herein. In addition, selecting a broadcast channel whose channel condition is favorable to the user equipment may be implemented based on receive power, and is not limited herein.

Optionally, a correspondence between the reference signal resource configuration index and the indicated reference signal resource configuration is predefined or is notified to the user equipment by using higher layer signaling or downlink control information (DCI).

S503. The user equipment receives a reference signal set sent by the base station, where the reference signal set corresponds to the reference signal resource configuration indicated by the reference signal resource configuration index.

Specifically, the user equipment may receive only the reference signal set corresponding to the reference signal resource configuration indicated by the reference signal resource configuration index.

S504. The user equipment determines channel state information according to the reference signal set.

Specifically, the channel state information may include a CQI, a PMI, or an RI. The determining, by the user equipment, channel state information CSI according to the reference signal set may include: obtaining, by the user equipment, a channel estimation value according to the reference signal set; and determining, by the user equipment, the CSI based on a preset criterion and according to the obtained channel estimation value.

Further, a specific implementation manner of determining, by the user equipment, channel state information according to the reference signal set may be: determining a $PMI_2$ according to the reference signal set, where the $PMI_2$ corresponds to a precoding matrix selected from a second codebook, the second codebook is determined according to the reference signal resource configuration index, and the channel state information includes the $PMI_2$.

Specifically, the second codebook may be determined according to the reference signal resource configuration index. For example, different codebooks may be determined according to a correspondence between a reference signal resource configuration index and a codebook, where the correspondence is shown in Table 3, in which $C_{N,i}$ may be the $i^{th}$ codebook of N antenna ports, where N=4 or 8.

Using a 4-antenna codebook as an example, a precoding matrix in $C_{4,0}$ may be a matrix in a 4-antenna codebook in an LTE system such as an R8 or R11 system, and a precoding matrix in $C_{4,i}$ may be shown by formula (22), where matrices $W_0$ and $W_i$ may be a matrix in $C_{4,0}$ and a matrix in $C_{4,i}$ respectively, and $\theta, \varphi$ are phases. For example, $$\theta = \frac{\pi}{64}, \frac{\pi}{32}, \frac{\pi}{16} \ldots, \varphi = \pi, \frac{\pi}{2}, \frac{\pi}{4}, \ldots.$$

Optionally, in an embodiment, the precoding matrix included in the second codebook is a discrete Fourier transform DFT matrix, a Hadamard matrix, a Householder matrix, a kronecker product of two DFT matrices, a kronecker product of a DFT matrix and a Hadamard matrix, or a kronecker product of a DFT matrix and a Householder matrix.

In addition, the channel estimation may be implemented according to the prior art, for example, by using the least square method or the minimum mean squared error method. The preset criterion may be a criterion such as capacity maximization or mutual information maximization or throughput maximization, which is not limited in the present disclosure. Selecting a precoding matrix according to a channel estimation by using a preset criterion is the prior art, and is not further described herein.

It should be pointed out that the precoding matrix in the second codebook may be pre-stored on the user equipment side or on the base station side, or may be calculated according to the structure of the precoding matrix, for example, calculated according to a relationship between the second precoding matrix indicator and the precoding matrix, which, however, is not limited in the present disclosure.

S505. The user equipment sends the reference signal resource configuration index and the channel state information to the base station.

Optionally, the user equipment may send the reference signal resource configuration index and the channel state information to the base station separately on a same subframe or on different subframes.

Further, optionally, a period of sending the reference signal resource configuration index is longer than a period of sending the channel state information. The reference signal resource configuration index is actually used to indicate a CSI measurement reference signal, the sounding signal generally has stronger spatial correlation, time correlation, or frequency correlation than the antenna port corresponding to the signal set, and a channel state changes relatively slowly. Therefore, a time interval or span of sending the reference signal resource configuration index may be longer, so as to further reduce time-frequency resource overheads occupied for sending of the sounding signal and reduce complexity of implementation by the UE.

In this embodiment of the present disclosure, a base station sends a sounding signal set to user equipment, and the user equipment determines a locally appropriate reference signal resource configuration index according to the sounding signal set, where the reference signal resource configuration index is used to indicate a reference signal resource configuration in reference signal resource configuration set information. When the base station sends a reference signal set to the outside, the user equipment obtains only a reference signal set corresponding to the reference signal resource configuration indicated by the reference signal resource configuration index, and then determines channel state information according to the reference signal set and reports the channel state information to the base station. This can effectively save time-frequency resource overheads, and effectively reduce complexity of CSI measurement performed by the user equipment or improve CSI feedback precision.

Figure 9:
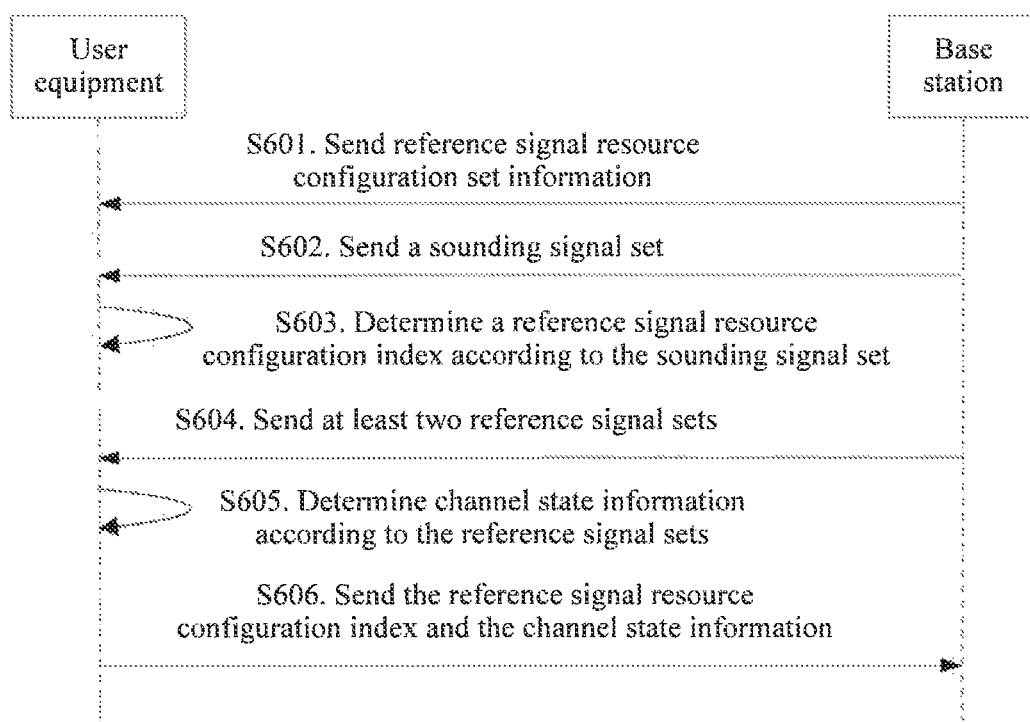
FIG. 9 is a schematic flowchart of another method for reporting channel state information according to an embodiment of the present disclosure.

FIG. 9 is a schematic flowchart of another method for reporting channel state information according to an embodiment of the present disclosure, where the method may include.

S601. A base station sends reference signal resource configuration set information to user equipment.

Specifically, the base station may notify the user equipment of the reference signal resource configuration set information by using higher layer signaling such as RRC signaling or DCI.

The reference signal resource configuration set information may also be predefined and known by both the user equipment and the base station.

The reference signal resource configuration set information includes at least two reference signal resource configurations. Referring to Table 4, Table 4 is an expression form of the reference signal resource configuration set information. As shown in the table, there are eight different reference signal resource configurations in the table. A reference signal resource configuration may include at least antenna port information and reference signal configuration information, where the reference signal configuration information is used to indicate a resource element used for sending a reference signal on an antenna port, and the antenna port information is a quantity of antenna ports corresponding to one of the reference signal configurations.

Optionally, the reference signal resource configuration set information may further include reference signal sequence information. For example, as shown in Table 5, the reference signal resource configuration indexes 0, 1, 2, and 3 support four antenna ports, and use a same reference signal configuration 0. That is, they occupy a same resource element but different reference signal sequences 0, 1, 2, and 3. Antennas corresponding to the different reference signal sequences 0, 1, 2, and 3 may be implemented by using different beams, and the different beams may be orthogonal to each other. On the one hand, using the same resource element can avoid occupying too many time-frequency resources, thereby effectively saving overheads. On the other hand, sending the different reference signal sequences 0, 1, 2, and 3 by the different beams may effectively reduce interference between different reference signals, thereby improving channel estimation precision and ensuring CSI measurement precision.

Specially, the reference signal resource configuration may have, but not being limited to, the following characteristics.

Characteristic 1: Antenna port sets corresponding to two reference signal resource configurations have at least one same antenna port. Specifically, using the reference signal resource configuration information in Table 4 as an example, reference signal configurations corresponding to the reference signal configuration information may correspond to different antenna port sets. As shown in Table 6, every two adjacent antenna port sets in 4-antenna-port sets have two same antenna ports, and every two adjacent antenna port sets in 8-antenna-port sets have four same antenna ports. On the one hand, the system can support more antenna ports. On the other hand, every two reference signal configurations configured by the user equipment have at least one same antenna port, so as to overcome a coverage gap between antenna ports and overcome an edge effect.

Characteristic 2: The reference signal sequence information is an initial value or cyclic shift value of a reference signal sequence, or different combinations of two base sequences. Specifically, the reference signal sequence information is different initial values or cyclic shift values of the reference signal sequence, or different combinations of two base sequences, as described above.

Characteristic 3: A different antenna port corresponding to each reference signal resource configuration uses a different resource reference signal configuration or a different reference signal sequence, as described above.

S602. The base station sends a sounding signal set to the user equipment.

The sounding signal set includes at least one sounding signal. It should be pointed out that.

In a first optional implementation manner, the sounding signal is a cell-specific reference signal or a channel state information reference signal. The CRS may support a cell-specific antenna port configuration, and is received by all user equipments in this cell. For example, the CRS may be a reference signal corresponding to an antenna port 0, 1, 2, or 3 in an LTE R8 system. The CSI RS supports signal transmission on a cell-specific antenna port and signal receiving on a user equipment specific antenna port. For example, the CSI RS may be a reference signal corresponding to an antenna port 15, 16, . . . , or 22 in an LTE R10 system. It should be pointed out that the CRS or the CSI RS is not limited to a current LTE system.

In a second optional implementation manner, the sounding signal is a synchronization signal. The synchronization signal is used to implement time and frequency synchronization. One of multiple known or optional synchronization signal sequences is mapped to a resource element set of a synchronization signal. According to the known or optional synchronization signal sequence, the user equipment may implement time and frequency synchronization by detecting the synchronization signal.

Specifically, the synchronization signal may be sent on at least one resource element set separately. For example, using a frame structure in an LTE system as an example, the at least one resource element set may be shown by formulas (1) and (2). The triplet $(k,l,n_s)$ denotes a location of a resource element used for the synchronization signal, where k, l, and $n_s$ are respectively a subcarrier index, an OFDM symbol index, and a timeslot index of the resource element; $N_{SS}$ denotes a length of a synchronization signal sequence.

Specifically, in each resource element set, the synchronization signal sends a synchronization signal sequence. The synchronization signal sequence may be a Zadoff-Chu (ZC) sequence. Using $N_{SS}$=62 as an example, the synchronization signal sequence is a ZC sequence shown by formula (3), or a cyclic shift of the ZC sequence shown by formula (4). The parameter u is a root index of the ZC sequence, and its value may be, for example, 25, 29, or 34; the parameter v is a cyclic shift value, and its value may be, for example, a positive integer such as 3 or 6.

Optionally, the synchronization signal sequence may also be an m sequence or a Gold sequence or a combination thereof, and is not further enumerated herein.

Specifically, the synchronization signal sequence may be separately mapped to different resource element sets. Using the ZC sequence whose length is 62 as an example, 62 elements in the sequence may be mapped to 62 resource element locations respectively. For example, a sequence element in an RE location $(k,l,n_s)$ in the resource element set $S_i^{SS}$ is formula (5) or formula (6), where $u_i$ and $v_i$ are respectively a root index value and a cyclic shift value of a ZC sequence used for the synchronization signal on the resource element set $S_i^{SS}$. A synchronization signal on a different resource element set $S_i^{SS}$ may use a different root index value or a different cyclic shift value or a combination thereof. It should be pointed out that a different $u_i$ or $v_i$ or a combination $(u_i,v_i)$ thereof may correspond to a different piece of information, so that the synchronization signal sent on the different resource element sets carries different information.

In a third optional implementation manner, the sounding signal is a broadcast channel. The broadcast channel is used to send a broadcast message. The broadcast message may include, for example, a system bandwidth, a system frame number, physical channel configuration indication information, or a combination thereof.

Specifically, the broadcast channel may be sent on at least one resource element set separately. For example, using a frame structure in an LTE system as an example, the at least one resource element set may be shown by formulas (7) and (8) or formulas (9) and (10).

The quadruplet $(k,l,n_s,n_f)$ denotes a location of a resource element used for the broadcast channel, where k, l, $n_s$, and $n_f$ are respectively a subcarrier index, an OFDM symbol index, a timeslot index, and a system frame number of the resource element; $j_0 \neq j_1$, and value ranges of all parameters j, $j_0$, and $j_1$ are 0 to 4N−1. The positive integer N in formulas (7) to (10) may be 1 or a positive integer greater than 1.

Specifically, a broadcast channel sent by each resource element group may be mapped to a corresponding resource element set after undergoing channel coding (by using a convolutional code or a Turbo code) and modulation. In addition, before channel coding, a cyclic redundancy check (CRC) code may be appended to the broadcast message.

Optionally, the broadcast channels in the different resource element sets may further carry additional information separately in addition to the system broadcast information. Optionally, an implementation manner may be:

Manner 1: The additional information and the broadcast information form a broadcast message, and undergo processing such as channel coding.

Manner 2: The additional information is denoted by a different CRC mask (Mask). Specifically, a CRC check bit corresponding to the broadcast message carried in the broadcast channel is $p_n$, n=0, 1, 2, . . . , $N_{CRC}$−1, and a CRC mask corresponding to the indication information is $x_n$, n=0, 1, 2, . . . , $N_{CRC}$−1. Therefore, after CRC mask scrambling, bit sequences shown by formulas (11) to (15) are generated.

It should be specially noted that the foregoing three implementation manners merely show three specific sounding signal types proposed in this embodiment of the present disclosure. However, type of the sounding signal is not limited thereto, and is not enumerated exhaustively herein.

S603. The user equipment determines a reference signal resource configuration index according to the sounding signal set.

Specifically, the user equipment determines the reference signal resource configuration index according to the received sounding signal set.

It should be pointed out that the reference signal resource configuration index is used to indicate a reference signal resource configuration in the reference signal resource configuration set information. Generally, each reference signal corresponds to one antenna port. By means of a least square (LS) method, a minimum mean squared error (MMSE) method, or the like, a channel estimation on a corresponding antenna port may be obtained according to a resource element location occupied by each reference signal in a resource grid of the corresponding antenna port.

Specifically, the reference signal resource configuration may include information such as a supported quantity of antenna ports, a reference signal sending period and an offset in the sending period, an RE location occupied by a reference signal, or a reference signal sequence. The RE location occupied by the reference signal or a time-frequency pattern of the reference signal is generally referred to as a reference signal configuration. Using 8 antenna ports as an example, RE locations corresponding to the 8 antenna ports in frame structures FS1 and FS are shown in FIG. 2a and FIG. 2b respectively. Using 16 antenna ports as an example, RE locations corresponding to the 16 antenna ports in the frame structures FS1 and FS are shown in FIG. 3a and FIG. 3b respectively. Using FIG. 3a as an example, RE locations denoted by digits 0, 1, . . . , 7 in the figure are locations occupied by reference signals.

Specifically, the reference signal sends a reference signal sequence on an occupied resource element set. Optionally, the reference signal sequence may be a ZC sequence or an m sequence, or may be obtained according to a combination of two base sequences or according to a pseudo random sequence, or the like. Optionally, the reference signal sequence may be obtained by means of cyclic shift according to a root sequence, or the reference signal sequence may be obtained according to a combination of two base sequences.

Type 1: The sounding signal is a CRS or a channel state information reference signal CSI RS, and the reference signal resource configuration index includes an $RI_1$ and/or a $PMI_1$. Specifically, the determining, by the user equipment, the $RI_1$ and/or the $PMI_1$ according to the CRS or the CSI RS includes: obtaining, by the user equipment, a channel estimation value according to the CRS or the CSI RS; and obtaining, by the user equipment, the channel estimation value, and selecting a first precoding matrix from a first codebook according to a preset criterion, where the first precoding matrix corresponds to the $RI_1$ and/or the $PMI_1$.

The channel estimation may be implemented according to the prior art, for example, by using the least square (LS) method or the minimum mean squared error (MMSE) method.

The preset criterion may be a criterion such as capacity maximization or mutual information maximization or throughput maximization, which is not limited in the present disclosure.

The first codebook is a precoding matrix set, in which each first precoding matrix is referred to as a codeword, and each codeword may be indicated by the $RI_1$ and/or the $PMI_1$.

Optionally, in an embodiment, the user equipment determines that a precoding matrix included in the first codebook used by the first precoding matrix is a precoding matrix in a 2-antenna codebook, a 4-antenna codebook, or an 8-antenna codebook in the LTE R10 system, or is a precoding matrix in a 2-antenna codebook, a 4-antenna codebook, or an 8-antenna codebook in an LTE R12 system.

In this embodiment of the present disclosure, optionally, as an embodiment, a precoding matrix included in the first codebook is a discrete Fourier transform (DFT) matrix, a Hadamard matrix, a Householder matrix, a kronecker product of two DFT matrices, a kronecker product of a DFT matrix and a Hadamard matrix, or a kronecker product of a DFT matrix and a Householder matrix.

It should be pointed out that the precoding matrix in the first codebook may be pre-stored on a user equipment side or on a base station side, or may be calculated according to a structure of the precoding matrix, for example, calculated according to a relationship between the first precoding matrix indicator and the precoding matrix, which, however, is not limited in the present disclosure.

Selecting a precoding matrix according to a channel estimation by using a preset criterion is the prior art, and is not further described herein.

A correspondence between the $RI_1$ and/or the $PMI_1$ included in the reference signal resource configuration index and the reference signal resource configuration information may be predefined or may be notified by the base station to the user equipment by using higher layer signaling such as RRC signaling or DCI, which is specifically shown in Table 1 or Table 2.

The user equipment may obtain the corresponding reference signal resource configuration according to the correspondence and according to the determined $RI_1$ and/or $PMI_1$ included in the reference signal resource configuration index.

Further, the CRS or the CSI RS is specified by a specific reference signal resource configuration in the reference signal resource configuration set information. For example, the CRS or the CSI RS is always specified by using the first reference signal resource configuration in the reference signal resource configuration set information.

Type 2: The sounding signal is a synchronization signal, and the reference signal resource configuration index is a resource identifier carried in the synchronization signal or associated with a resource location of the synchronization signal, where the resource identifier carried in the synchronization signal or associated with the resource location of the synchronization signal indicates a reference signal resource configuration in the reference signal resource configuration set information. Optionally, a different resource identifier carried in the synchronization signal is denoted by a different synchronization signal sequence. Specifically, the resource identifier may be denoted by the different synchronization signal sequence. For example, as mentioned above, the synchronization signal sequence is a ZC sequence, and therefore, a different resource identifier may correspond to a different root index value or a different cyclic shift value of the ZC sequence. For example, as mentioned above, the synchronization signal sequence is an m sequence or a Gold sequence or a combination thereof, and therefore, a different resource identifier may correspond to a different m sequence or Gold sequence, or a combination thereof, or a different initial value thereof, or a different cyclic shift value thereof.

The user equipment may directly determine, by detecting and determining a synchronization channel whose channel condition is favorable to the user equipment, the reference signal resource configuration index corresponding to the sounding signal according to the synchronization signal or the resource identifier of the synchronization signal. Implementing time or frequency synchronization by using the structure of the synchronization signal and the corresponding synchronization signal sequence is the prior art, and is not described herein. In addition, selecting a synchronization signal whose channel condition is favorable to the user equipment may be implemented based on receive power, and is not limited herein.

Type 3: The sounding signal is a broadcast channel. The reference signal resource configuration index is a resource identifier carried in the broadcast channel or associated with a resource location of the broadcast channel, where the resource identifier carried in the broadcast channel or associated with the resource location of the broadcast channel indicates a reference signal resource configuration in the reference signal resource configuration set information.

Optionally, the resource identifier carried in the broadcast channel may be carried in a broadcast message of a different resource element set, where a broadcast message of a different resource element set carries a different resource identifier. By means of detection and decoding to obtain a corresponding broadcast message, the user equipment can obtain the corresponding resource identifier.

Optionally, the resource identifier carried in the broadcast channel is denoted by a different cyclic redundancy check mask. By means of detection and decoding, the user equipment obtains the corresponding broadcast channel, and then performs a hypothesis test on the used CRC mask to obtain the corresponding CRC mask, so as to obtain the corresponding resource identifier. In addition, in the foregoing two implementations, the user equipment obtains, by detecting a broadcast channel whose channel condition is favorable to the user equipment, a resource identifier whose channel condition is favorable to the user equipment.

Receiving the broadcast channel by using the structure of the broadcast channel and the corresponding CRC is the prior art, and is not described herein. In addition, selecting a broadcast channel whose channel condition is favorable to the user equipment may be implemented based on receive power, and is not limited herein.

Optionally, a correspondence between the reference signal resource configuration index and the indicated reference signal resource configuration is predefined (Predefined) or is notified to the user equipment by using higher layer signaling or DCI.

S604. The base station sends at least two reference signal sets to the user equipment.

The reference signal set has been elaborated earlier above, and is not described herein. It should be pointed out that the user equipment may receive only a reference signal set corresponding to the reference signal resource configuration indicated by the reference signal resource configuration index.

S605. The user equipment determines channel state information according to the reference signal sets.

Specifically, the channel state information may include a CQI, a PMI, or an RI. The determining, by the user equipment, channel state information CSI according to the reference signal set may include: obtaining, by the user equipment, a channel estimation value according to the reference signal set; and determining, by the user equipment, the CSI based on a preset criterion and according to the obtained channel estimation value.

Further, a specific implementation manner of determining, by the user equipment, channel state information according to the reference signal set may be: determining a $PMI_2$ according to the reference signal set, where the $PMI_2$ corresponds to a precoding matrix selected from a second codebook, the second codebook is determined according to the reference signal resource configuration index, and the channel state information includes the $PMI_2$.

Specifically, the second codebook may be determined according to the reference signal resource configuration index. For example, different codebooks may be determined according to a correspondence between a reference signal resource configuration index and a codebook, where the correspondence is shown in Table 3, in which $C_{N,i}$ may be the $i^{th}$ codebook of N antenna ports, where N=4 or 8. Using a 4-antenna codebook as an example, a precoding matrix in $C_{4,0}$ may be a matrix in a 4-antenna codebook in an LTE system such as an R8 or R11 system, and a precoding matrix in $C_{4,i}$ may be shown by formula (22).

Optionally, in an embodiment, the precoding matrix included in the second codebook is a DFT matrix, a Hadamard matrix, a Householder matrix, a kronecker product of two DFT matrices, a kronecker product of a DFT matrix and a Hadamard matrix, or a kronecker product of a DFT matrix and a Householder matrix.

In addition, the channel estimation may be implemented according to the prior art, for example, by using the least square method or the minimum mean squared error method. The preset criterion may be a criterion such as capacity maximization or mutual information maximization or throughput maximization, which is not limited in the present disclosure. Selecting a precoding matrix according to a channel estimation by using a preset criterion is the prior art, and is not further described herein.

It should be pointed out that the precoding matrix in the second codebook may be pre-stored on the user equipment side or on the base station side, or may be calculated according to the structure of the precoding matrix, for example, calculated according to a relationship between the second precoding matrix indicator and the precoding matrix, which, however, is not limited in the present disclosure.

S606. The user equipment sends the reference signal resource configuration index and the channel state information to the base station.

Specifically, the user equipment sends the reference signal resource configuration index and reports the channel state information to the base station.

Optionally, the user equipment may send the reference signal resource configuration index and the channel state information to the base station separately on a same subframe or on different subframes.

Further, optionally, a period of sending the reference signal resource configuration index is longer than a period of sending the channel state information. The reference signal resource configuration index is actually used to indicate a CSI measurement reference signal, the sounding signal generally has stronger spatial correlation, time correlation, or frequency correlation than the antenna port corresponding to the signal set, and a channel state changes relatively slowly. Therefore, a time interval or span of sending the reference signal resource configuration index may be longer, so as to further reduce time-frequency resource overheads occupied for sending of the sounding signal and reduce complexity of implementation by the UE.

In this embodiment of the present disclosure, a base station sends a sounding signal set to user equipment, and the user equipment determines a locally appropriate reference signal resource configuration index according to the sounding signal set, where the reference signal resource configuration index is used to indicate a reference signal resource configuration in reference signal resource configuration set information. When the base station sends a reference signal set to the outside, the user equipment obtains only a reference signal set corresponding to the reference signal resource configuration indicated by the reference signal resource configuration index, and then determines channel state information according to the reference signal set and reports the channel state information to the base station. This can effectively save time-frequency resource overheads, and effectively reduce complexity of CSI measurement performed by the user equipment or improve CSI feedback precision.

An embodiment of the present disclosure further proposes a computer storage medium, and the computer storage medium stores a program. When being executed, the program includes some or all of the steps in the method for reporting channel state information that is described with reference to FIG. 5 to FIG. 6 in the embodiments of the present disclosure.

In this embodiment of the present disclosure, a base station sends a sounding signal set to user equipment, and the user equipment determines a locally appropriate reference signal resource configuration index according to the sounding signal set, where the reference signal resource configuration index is used to indicate a reference signal resource configuration in reference signal resource configuration set information. When the base station sends a reference signal set to the outside, the user equipment obtains only a reference signal set corresponding to the reference signal resource configuration indicated by the reference signal resource configuration index, and then determines channel state information according to the reference signal set and reports the channel state information to the base station. This can effectively save time-frequency resource overheads, and effectively reduce complexity of CSI measurement performed by the user equipment or improve CSI feedback precision.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A user equipment comprising:
a processor; and
a non-transitory computer readable storage medium storing a program for execution by the processor, the program including instructions to:
receive a sounding signal set sent by a base station, wherein the sounding signal set comprises at least one sounding signal;
determine a reference signal resource configuration index according to the sounding signal set, wherein the reference signal resource configuration index indicates a first reference signal resource configuration in reference signal resource configuration set information;
determine channel state information according to a reference signal set, wherein the reference signal set corresponds to the first reference signal resource configuration indicated by the reference signal resource configuration index; and
send, to the base station, the reference signal resource configuration index and the channel state information.

2. The user equipment according to claim 1, wherein the program further comprises instructions to receive the reference signal resource configuration set information sent by the base station, wherein the reference signal resource configuration set information comprises at least two reference signal resource configurations, and the at least two reference signal resource configurations comprise the first reference signal resource configuration.

3. The user equipment according to claim 1, wherein the at least one sounding signal comprises a channel state information reference signal (CSI RS).

4. The user equipment according to claim 1, wherein the at least one sounding signal comprises a synchronization signal, and the reference signal resource configuration index comprises a resource identifier, and the resource identifier is carried in the synchronization signal or is associated with a resource location of the synchronization signal.

5. The user equipment according to claim 1, wherein the at least one sounding signal comprises a broadcast channel, wherein the reference signal resource configuration index comprises a resource identifier, and the resource identifier is carried in the broadcast channel or is associated with a resource location of the broadcast channel.

6. The user equipment according to claim 1, wherein the reference signal resource configuration information comprises antenna port information, reference signal configuration information, or reference signal sequence information, and wherein the reference signal configuration information indicates a resource element used for sending a reference signal on an antenna port.

7. The user equipment according to claim 6, wherein antenna port sets corresponding to two reference signal resource configurations have at least one same antenna port.

8. A base station comprising:
a processor; and
a non-transitory computer readable storage medium storing a program for execution by the processor, the program including instructions to:
send, to a user equipment, a sounding signal set, wherein the sounding signal set comprises at least one sounding signal, and wherein the user equipment determines a reference signal resource configuration index according to the sounding signal set, wherein the reference signal resource configuration index indicates a first reference signal resource configuration in a reference signal resource configuration set, and the first reference signal resource configuration is used for obtaining channel state information; and
receive the reference signal resource configuration index and the channel state information that are sent by the user equipment, wherein the channel state information corresponds to a reference signal set, and the reference signal set corresponds to the first reference signal resource configuration indicated by the reference signal resource configuration index.

9. The base station according to claim 8, wherein the program further comprises instructions to send the reference signal resource configuration set information to the user equipment, wherein the reference signal resource configuration set information comprises at least two reference signal resource configurations, and the at least two reference signal resource configurations comprises the first reference signal resource configuration.

10. The base station according to claim 8, wherein the at least one sounding signal is a channel state information reference signal (CSI RS).

11. The base station according to claim 8, wherein the at least one sounding signal comprises a synchronization signal, the reference signal resource configuration index comprises a resource identifier, and the resource identifier is carried in the synchronization signal or is associated with a resource location of the synchronization signal.

12. The base station according to claim 8, wherein the at least one sounding signal comprises a broadcast channel, the reference signal resource configuration index comprises a resource identifier, and the resource identifier is carried in the broadcast channel or is associated with a resource location of the broadcast channel.

13. The base station according to claim 8, wherein the reference signal resource configuration set information comprises antenna port information, reference signal configuration information, or reference signal sequence information, and wherein the reference signal configuration information indicates a resource element used for sending a reference signal on an antenna port.

14. The base station according to claim 13, wherein antenna port sets corresponding to at least two reference signal resource configurations have at least one same antenna port.

15. A method comprising:
receiving, by a user equipment, a sounding signal set sent by a base station, wherein the sounding signal set comprises at least one sounding signal;
determining, by the user equipment, a reference signal resource configuration index according to the sounding signal set, wherein the reference signal resource configuration index indicates a first reference signal resource configuration in reference signal resource configuration set information;

determining, by the user equipment, channel state information according to a reference signal set, wherein the reference signal set corresponds to the first reference signal resource configuration indicated by the reference signal resource configuration index; and sending, by the user equipment to the base station, the reference signal resource configuration index and the channel state information.

16. The method according to claim 15, further comprising:

receiving, by the user equipment, the reference signal resource configuration set information sent by the base station, wherein the reference signal resource configuration set information comprises at least two reference signal resource configurations, and the at least two reference signal resource configurations comprise the first reference signal resource configuration.

17. The method according to claim 15, wherein the at least one sounding signal comprises a channel state information reference signal (CSI RS).

18. The method according to claim 15, wherein the at least one sounding signal comprises a synchronization signal, the reference signal resource configuration index is a resource identifier, and the resource identifier is carried in the synchronization signal or is associated with a resource location of the synchronization signal.

19. The method according to claim 15, wherein the at least one sounding signal is a broadcast channel, the reference signal resource configuration index is a resource identifier, and the resource identifier is carried in the broadcast channel or is associated with a resource location of the broadcast channel.

20. The method according to claim 15, wherein the reference signal resource configuration information comprises antenna port information, reference signal configuration information, or reference signal sequence information, and wherein the reference signal configuration information indicates a resource element used for sending a reference signal on an antenna port.

* * * * *